United States Patent (10) Patent No.: US 7,066,604 B2
Kim et al. (45) Date of Patent: Jun. 27, 2006

(54) LIGHT PIPE, COLOR ILLUMINATION SYSTEM ADOPTING THE LIGHT PIPE, AND PROJECTION SYSTEM EMPLOYING THE COLOR ILLUMINATION SYSTEM

(75) Inventors: Sung-ha Kim, Seoul (KR); Kun-ho Cho, Suwon-si (KR); Dae-sik Kim, Suwon-si (KR); Hee-joong Lee, Anyang-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 0 days.

(21) Appl. No.: 10/736,985

(22) Filed: Dec. 17, 2003

(65) Prior Publication Data

US 2004/0263793 A1 Dec. 30, 2004

(30) Foreign Application Priority Data

Dec. 21, 2002 (KR) ............... 10-2002-0082093
Jan. 24, 2003 (KR) ............... 10-2003-0004840
Feb. 28, 2003 (KR) ............... 10-2003-0012699
Mar. 18, 2003 (KR) ............... 10-2003-0016843

(51) Int. Cl.
*G03B 21/28* (2006.01)
*G02F 1/1335* (2006.01)

(52) U.S. Cl. ............... 353/81; 353/33; 353/84; 362/560; 362/583; 349/57

(58) Field of Classification Search ............... 353/33, 353/31, 30, 20, 37, 81, 84, 98, 99, 122, 28; 359/831, 833, 834; 348/762, 767, 782, 781, 348/804; 385/11, 901, 129–133; 362/552, 362/583, 558, 559, 580, 582, 297
See application file for complete search history.

(56) References Cited

U.S. PATENT DOCUMENTS 3,510,216 A * 5/1970 Wagman ............... 353/32
3,702,929 A * 11/1972 Burch ............... 362/268
6,022,110 A * 2/2000 Tsujikawa ............... 353/20
6,130,728 A 10/2000 Tsujikawa et al.
6,288,815 B1 * 9/2001 Lambert ............... 359/196
6,332,684 B1 12/2001 Shibatani et al.

(Continued)

FOREIGN PATENT DOCUMENTS

EP 1 253 787 10/2002

(Continued)

OTHER PUBLICATIONS

Patent Abstracts of Japan, vol. 2000, No. 01, Jan. 31, 2000 corresponding to JP 11 281930 A (Mitsubishi Electric Corp), Oct. 15, 1999.

*Primary Examiner*—W. B. Perkey
*Assistant Examiner*—Andrew Sever
(74) *Attorney, Agent, or Firm*—Sughrue Mion, PLLC

(57) ABSTRACT

A light pipe for separating incident light according to color, a color illumination system adopting the light pipe, and a projection system adopting the color illumination system are provided. Since the projection system is a single-panel projection system adopting a scrolling unit, its optical configuration is simplified. Also, the light pipe of the projection system is comprised of different-sized color separation units, thus improving the color gamut and the color temperature. Further, the light pipe includes color selection polarizers, each of which changes the polarization direction of a color beam with a specific wavelength, thereby improving light efficiency.

16 Claims, 32 Drawing Sheets

U.S. PATENT DOCUMENTS

| | | |
|---|---|---|
| 6,406,149 B1 * | 6/2002 | Okuyama .................... 353/38 |
| 6,535,256 B1 * | 3/2003 | Ishihara et al. ................ 349/5 |
| 6,956,701 B1 * | 10/2005 | Peterson et al. ............ 359/618 |
| 2001/0033367 A1 | 10/2001 | Karasawa et al. |
| 2001/0048801 A1 * | 12/2001 | Saccomanno ............... 385/147 |
| 2003/0090632 A1 * | 5/2003 | Kim et al. .................... 353/31 |
| 2003/0095213 A1 * | 5/2003 | Kanayama et al. ......... 348/742 |
| 2004/0047162 A1 * | 3/2004 | Saccomanno et al. ...... 362/558 |
| 2004/0263794 A1 * | 12/2004 | Yoon ........................... 353/33 |

FOREIGN PATENT DOCUMENTS

| | | |
|---|---|---|
| EP | 1 424 857 A | 6/2004 |
| JP | 11 271673 | 10/1999 |
| WO | WO 00/60397 A | 10/2000 |

* cited by examiner

LIGHT PIPE, COLOR ILLUMINATION SYSTEM ADOPTING THE LIGHT PIPE, AND PROJECTION SYSTEM EMPLOYING THE COLOR ILLUMINATION SYSTEM

BACKGROUND OF THE INVENTION

This application claims the benefits of Korean Patent Applications Nos. 2002-82093, 2003-4840, 2003-12699, and 2003-16843, filed on Dec. 21, 2002, on Jan. 24, 2003, on Feb. 28, 2003, and on Mar. 18, 2003, respectively, in the Korean Intellectual Property Office, the disclosures of which are incorporated herein in their entireties by reference.

1. Field of the Invention

The present invention relates to a light pipe which increases light efficiency and has a small size by separating incident light according to color without light loss and scrolling the separated color beams, a color illumination system adopting the light pipe, and a projection system adopting the color illumination system.

2. Description of the Related Art

Projection systems are classified into 3-panel projection systems and single-panel projection systems according to the number of light valves that form an image by controlling the on/off operation of light emitted from a high-output lamp on a pixel-by-pixel basis. Single-panel projection systems can have a smaller optical system than three-panel projection systems but provide an optical efficiency of ⅓ less than that of three-panel projection systems because R, G, and B colors into which white light is separated are sequentially used. Hence, attempts to increase the optical efficiency of single-panel projection systems have been made.

In a general single-panel projection system, light radiated from a white light source is separated into R, G, and B colors using a color filter, and the three colors are sequentially sent to a light valve. The light valve appropriately operates according to the sequence of colors received and creates images. As described above, a single-panel optical system sequentially uses colors, so the light efficiency is reduced to ⅓ of the light efficiency of a three-panel optical system. A scrolling method has been proposed to solve this problem. In a color scrolling method, white light is separated into R, G, and B colors, and the three colors are sent to different locations on a light valve: Since an image cannot be produced until all of R, G, and B colors for each pixel reach the light valve, color bars are moved at a constant speed in a particular method.

In a conventional single-panel scrolling projection system, as shown in FIG. 1, white light emitted from a light source 100 passes through first and second lens arrays 102 and 104 and a polarized beam splitter array 105 and is separated into R, G, and B beams by first through fourth dichroic filters 109, 112, 122, and 139. To be more specific, the red beam R and the green beam G, for example, are transmitted by the first dichroic filter 109 and advance along a first light path I1, while the blue beam B is reflected by the first dichroic filter 109 and travels along a second light path I2. The red beam R and the green beam G on the first light path I1 are separated by the second dichroic filter 112. The second dichroic filter 112 transmits the red beam R along the first light path I1 and reflects the green beam G along a third light path I3.

As described above, the light emitted from the light source 100 is separated into the red beam R, the green beam G, and the blue beam B, and they are scrolled while passing through corresponding first through third prisms 114, 135, and 142. The first through third prisms 114, 135 and 142 are disposed on the first through third light paths I1, I2, and I3, respectively, and rotate at a uniform speed such that R, G, and B color bars are scrolled. The green beam G and the blue beam B that travel along the second and third light paths I2 and I3, respectively, are transmitted and reflected by the third dichroic filter 139, respectively, and then combined. Finally, the R, G, and B beams are combined by the fourth dichroic filter 122. The combined beam is transmitted by a polarized beam splitter 127 and forms a picture using a light valve 130.

The scrolling of the R, G, and B color bars due to rotation of the first through third prisms 114, 135, and 142 is shown in FIG. 2. Scrolling represents the movement of color bars formed on the surface of the light valve 130 when prisms corresponding to colors are synchronously rotated.

The light valve 130 forms a picture by processing picture information that depends on an on-off signal for each pixel. The formed picture is magnified by a projecting lens (not shown) and lands on a screen.

Since such a method is performed using a light path provided for each color, a light path correction lens must be provided for each color, and a component part for re-collecting separated light beams must be provided for each color. Accordingly, an optical system is large, and yield is degraded due to a complicate manufacturing and assembling process. In addition, a large amount of noise is generated due to the driving of three motors for rotating the first through third prisms 114, 135, and 142, and the manufacturing costs of a conventional projection system adopting the above-described method is increased compared to a color wheel method adopting only one motor.

In order to produce a color picture using a scrolling technique, color bars as shown in FIG. 2 must be moved at a constant speed. The conventional projection system must synchronize a light valve with three prisms in order to achieve scrolling. However, controlling the synchronization is not easy. Further, because the scrolling prisms 114, 135, and 142 make circular motions, the speed of color scrolling by the three scrolling prisms is irregular, consequently deteriorating the quality of an image.

SUMMARY OF THE INVENTION

An aspect of the present invention provides a light pipe designed to separate incident white light into a plurality of color beams.

Another aspect of the present invention provides a color illumination system which has a simple optical configuration and can illuminate a display device with color beams that are scrolled.

Still another aspect of the present invention provides a single-panel projection system designed so that scrolling is easily synchronized with the operation of the display device, while having a simple optical configuration.

The present invention provides a light pipe which can provide various color gamuts or various color temperatures by differentiating the areas of color bars according to color, and a projection system adopting the light pipe.

The present invention also provides a projection system which is made compact by including a single color scrolling unit and effectively performs color scrolling to improve the quality of an image.

According to one aspect of the present invention, there is provided a light pipe according to a first embodiment of the present invention, which includes first, second, and third dichroic prisms. The first dichroic prism has a first mirror plane, which is inclined with respect to the axis of incident light and reflects a first color beam among white light while transmitting the other color beams. The second dichroic prism has a second mirror plane, which is inclined with respect to the axis of incident light and reflects a second color beam among the color beams transmitted by the first dichroic prism while transmitting the other color beam. The third dichroic prism has a third mirror plane, which is inclined with respect to the axis of incident light and reflects a third color beam transmitted by the second dichroic prism.

According to one aspect of the present invention, there is provided a light pipe according to a second embodiment of the present invention, which includes first, second, and third dichroic mirror planes. The first dichroic mirror plane reflects a first color beam among incident light while transmitting second and third color beams. The second dichroic mirror plane is installed on the path of light transmitted by the first dichroic mirror plane, has an area equal to or different than an area of the first dichroic mirror plane, and reflects the second color beam while transmitting the third color beam. The third dichroic mirror plane is installed on the path of light transmitted by the second dichroic mirror plane, has an area different from at least one of the areas of the first and second dichroic mirror planes, and reflects the third color beam.

According to one aspect of the present invention, there is provided a light pipe according to a third embodiment of the present invention, which includes a first polarized beam splitter for transmitting light in one polarization direction among unpolarized white light and at the same time reflecting light in the other polarization direction, a second polarized beam splitter installed below the first polarized beam splitter, a plurality of polarized beam splitters installed adjacent to the first and second polarized beam splitters, a plurality of color selection polarizers which are installed in front of the plurality of polarized beam splitters, respectively, and change the polarization directions of corresponding color beams among incident light, and a ½ wavelength plate which is installed between one of the first and second polarized beam splitters and a color selection polarizer closest to the first and second polarized beam splitters.

In the light pipe according to the third embodiment of the present invention, the plurality of polarization beam splitters are third, fourth, and fifth polarized beam splitters sequentially installed adjacent to the first and second polarized beam splitters. The plurality of color selection polarizers are a first color selection polarizer, which is installed between an array of the first and second polarized beam splitters and the third polarized beam splitter and changes the polarization direction of a first color beam among incident light, and a second color selection polarizer, which is installed between the third and fourth polarized beam splitters and changes the polarization direction of a second color beam among incident light. A polarization converter is installed between the fourth and fifth polarized beam splitters and changes the polarization direction of a third color beam among incident light. The polarization converter is either a third color selection polarizer or a ½ wavelength plate.

According to another aspect of the present invention, there is provided a color illumination system, which includes a light source for producing and radiating light, the light pipe according to the first embodiment of the present invention, a first focusing lens for focusing the separated beams, and a scrolling unit which changes the paths of the separated beams focused by the first focusing lens and periodically scrolls the separate beams. This light pipe separates incident light according to a wavelength range and advances separated beams at different angles. The exterior of each of the first, second, and third dichroic prisms is formed by reflective planes which reflect light that is incident at a predetermined angle due to a difference between the refractive indices of each of the reflective planes and the outside so that the incident light travels within the first, second, and third dichroic prisms.

According to another aspect of the present invention, there is provided another color illumination system, which includes a light source producing and radiating light, the light pipe according to the third embodiment of the present invention, and a scrolling unit for performing color scrolling by periodically changing the paths of the color beams, into which the light radiated from the light source has been separated by the light pipe. The plurality of polarization beam splitters are third, fourth, and fifth polarized beam splitters sequentially installed adjacent to the first and second polarized beam splitters. The plurality of color selection polarizers are a first color selection polarizer, which is installed between an array of the first and second polarized beam splitters and the third polarized beam splitter and changes the polarization direction of a first color beam among incident light, and a second color selection polarizer, which is installed between the third and fourth polarized beam splitters and changes the polarization direction of a second color beam among incident light. A polarization converter is installed between the fourth and fifth polarized beam splitters and changes the polarization direction of a third color beam among incident light. The polarization converter is one of a third color selection polarizer and a ½ wavelength plate.

According to still another aspect of the present invention, there is provided a projection system according to a first embodiment of the present invention. This projection system includes a light source for producing and radiating light, the light pipe according to the first embodiment of the present invention, a first focusing lens for focusing the separated beams, a scrolling unit for changing the paths of the separated beams focused by the first focusing lens and periodically scrolling the separate beams, a second focusing lens for re-focusing beams transmitted by the scrolling unit, a fly-eye lens array for delivering the beams transmitted by the scrolling unit, a light valve for producing an image from beams transmitted by the fly-eye lens array, and a projection lens unit for magnifying the image produced by the light valve and projecting the magnified image onto a screen.

According to still another aspect of the present invention, there is provided a projection system according to a second embodiment of the present invention, which adopts the light pipe according to the second embodiment of the present invention.

According to still another aspect of the present invention, there is provided a projection system according to a third embodiment of the present invention. This projection system includes a light source for producing and radiating light, the light pipe according to the third embodiment of the present invention, a scrolling unit for performing color scrolling by periodically changing the paths of the color beams, into which the light radiated from the light source has been separated by the light pipe, a light valve for producing a color image by processing the scrolling beams according to an image signal, and a projection lens unit magnifying the image produced by the light valve and projecting the magnified image onto a screen.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

Figure 1:
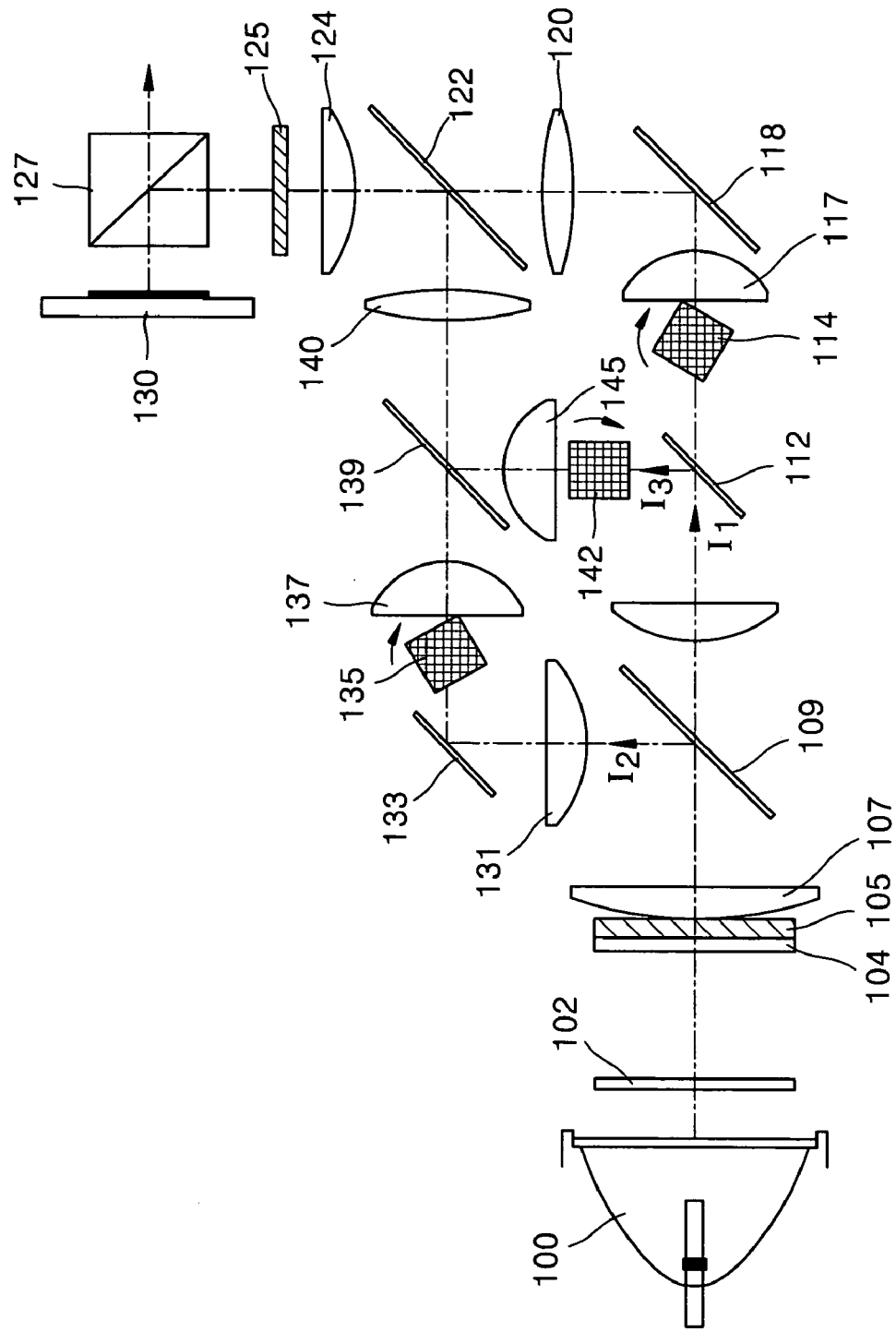
FIG. 1 is a schematic view of the optical configuration of a conventional single-panel projection system adopting a conventional color illumination system.
Figure 2:
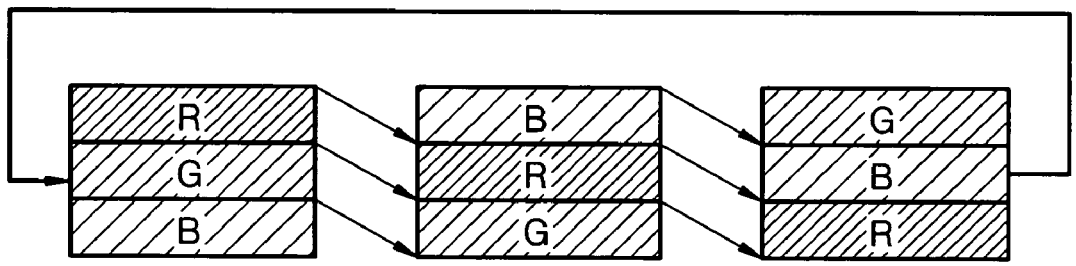
FIG. 2 illustrates how R, G, and B color bars are scrolled due to rotation of the prisms of FIG. 1.
Figure 3:
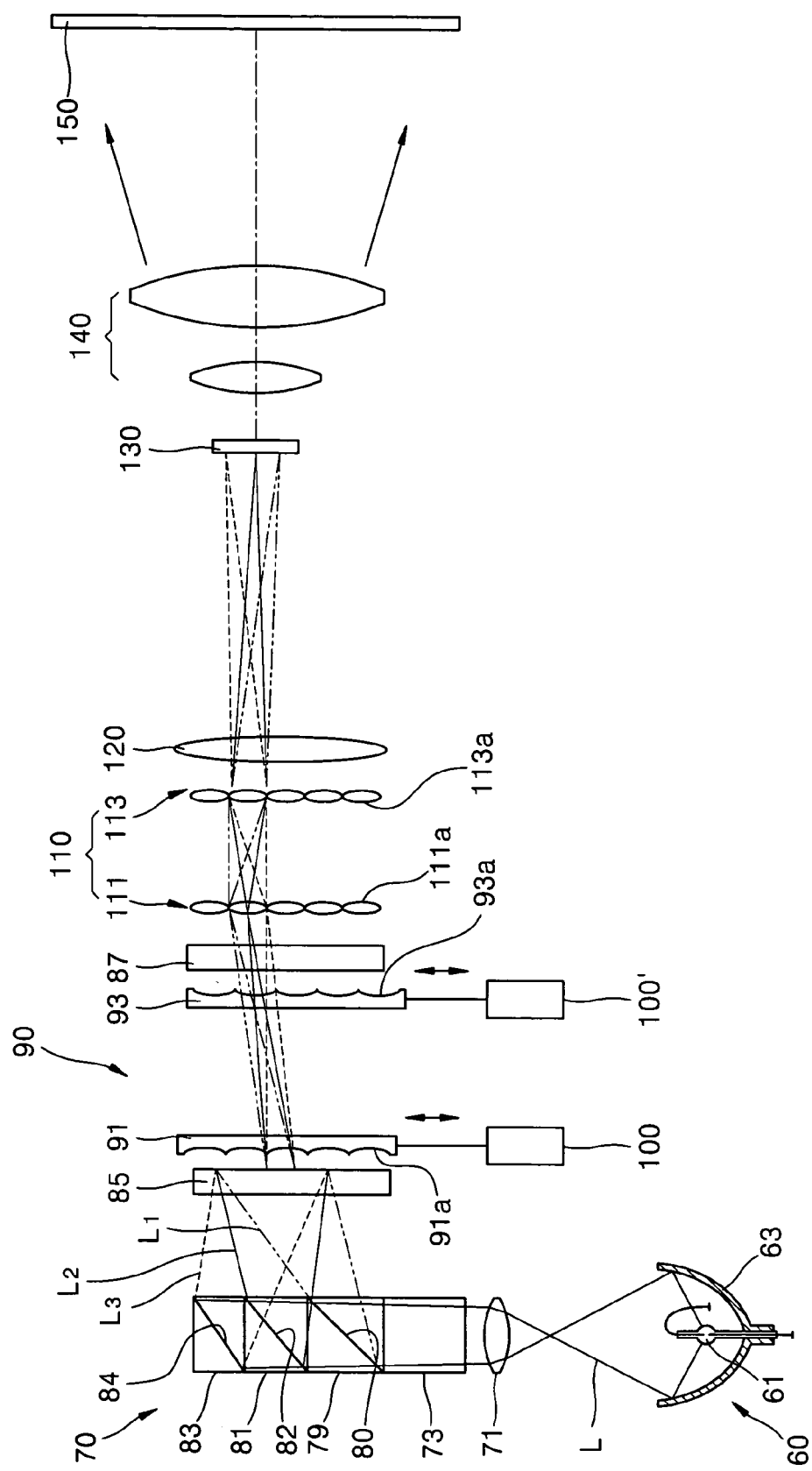
FIG. 3 shows an optical configuration of a color illumination system according to a first embodiment of the present invention and an optical configuration of a projection system according to a first embodiment of the present invention adopting the color illumination system.

FIG. 3 shows an optical configuration of a color illumination system according to a first embodiment of the present invention and an optical configuration of a projection system according to a first embodiment of the present invention adopting the color illumination system. Referring to FIG. 3, the color illumination system according to the first embodiment of the present invention includes a light source 60, a light pipe 70, a first focusing lens 85, and a scrolling unit 90. The light pipe 70 separates light emitted from the light source 60, according to a wavelength range. The first focusing lens 85 focuses beams into which the light has been separated by the light pipe 70. The scrolling unit 90 forms color bars by changing the travel paths of the separated beams in different wavelength ranges and scrolls the incident separated beams so that the color bars can be periodically scrolled.

The light source 60 produces and emits white light and includes a lamp 61 for generating light and a reflection mirror 63 for reflecting light emitted from the lamp 61 and guiding the path of the reflected light. The reflection mirror 63 may be an elliptic mirror whose first focal point is the position of the lamp 61 and a second focal point is a point where light is focused. Alternatively, the reflection mirror 63 may be a parabolic mirror which uses the lamp 61 as a focal point and is designed so that light beams that are emitted from the lamp 61 and reflected by the parabolic mirror are collimated. The reflection mirror 63 shown in FIG. 3 is an elliptic mirror.

The light pipe 70 separates incident light according to a wavelength range and advances the separated beams at different angles. Also, the light pipe 70 can increase the light usage efficiency by preventing the separated beams from being emitted in directions other than a desired direction.

Figure 4:
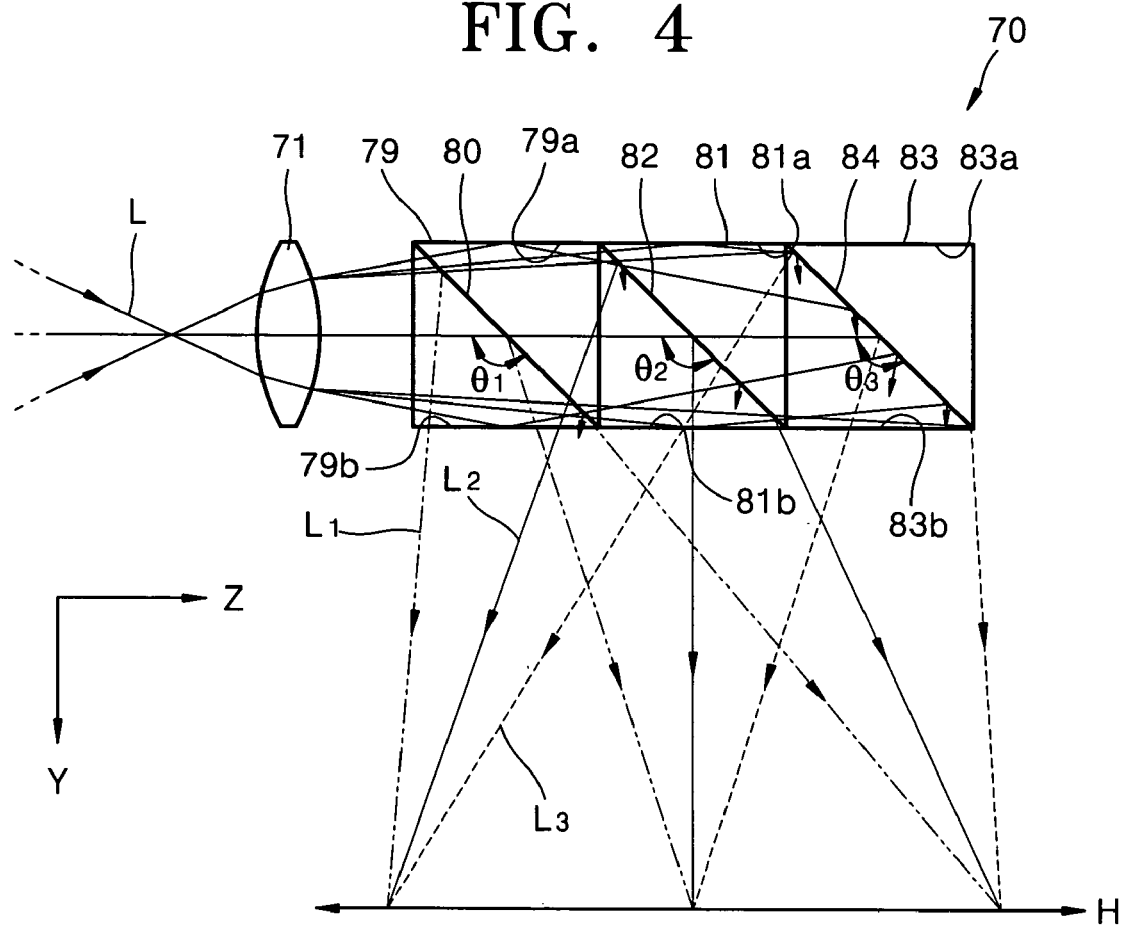
FIG. 4 is a schematic view of an optical configuration of a light pipe according to a first embodiment of the present invention shown in FIG. 3.

To achieve this, the light pipe 70 according to a first embodiment of the present invention includes a plurality of dichroic prisms, each of which reflects light in a particular wavelength range and at the same time transmits light in other wavelength ranges so that incident light (L) can be separated according to a wavelength range. As shown in FIG. 4, the light pipe 70 includes first, second, and third dichroic prisms 79, 81, and 83 for separating the incident light L into first, second, and third color beams $L_1$, $L_2$, and $L_3$.

The first dichroic prism 79 has a first mirror plane 80, which is inclined by an angle $\theta_1$ with respect to the optical axis of the incident light L. The first mirror plane 80 reflects the first color beam $L_1$ among the incident light L and transmits the second and third color beams $L_2$ and $L_3$. In other words, the first mirror plane 80 reflects a blue beam B and transmits beams of other colors.

The first dichroic prism 79 also has first reflective planes 79a and 79b, which form the exterior of the first dichroic prism 79. The first reflective planes 79a and 79b reflect incident light so as to travel within the first dichroic prism 79. The incident light has an angle due to the difference between the refractive indices of the first dichroic prism 79 and the outside. To be more specific, the first reflective planes 79a and 79b totally reflect light that is incident at an angle greater than a predetermined angle, that is, a critical angle, due to the difference between the refractive indices of the first dichroic prism 79 and the outside. Thus, the light usage efficiency of the incident light L is increased.

The second dichroic prism 81 is installed close to the first dichroic prism 79 and has a second mirror plane 82, which is inclined by an angle $\theta_2$ with respect to the optical axis of the incident light L. The second mirror plane 82 reflects the second color beam $L_2$, for example, a red beam R, among the incident light L and transmits the first and third color beams $L_1$ and $L_3$.

The third dichroic prism 83 is installed close to the second dichroic prism 81 and has a third mirror plane 84, which is inclined by an angle $\theta_3$ with respect to the optical axis of the incident light L. The third mirror plane 84 reflects the third color beam $L_3$, for example, a green beam G, among the incident light L and transmits the first and second color beams $L_1$ and $L_2$. The third mirror plane 83 may be replaced by a total reflection mirror that can reflect all incident light.

The second and third dichroic prisms 81 and 83 also have second reflective planes 81a and 81b and third reflective planes 83a and 83b, respectively, which form the exteriors of the second and third dichroic prisms 81 and 83. Since the second reflective planes 81a and 81b and the third reflective planes 83a and 83b play substantially the same role as the first reflective planes 79a and 79b, they will not be described here in detail.

As described above, because the light efficiency is increased due to the use of the first, second, and third reflective planes 79a & 79b, 81a & 81b, and 83a & 83b, an influence of a change in the etendue upon an optical system can be reduced. The etendue denotes an optical conservation quantity in an optical system.

$\theta_1$, $\theta_2$, and $\theta_3$ are made obtuse angles so that the first, second, and third color beams $L_1$, $L_2$, and $L_3$ reflected by the first, second, and third mirror planes 80, 82, and 84, respectively, can be focused on an image plane (H) of the first focusing lens 85 of FIG. 3. To achieve this, the obtuse angles $\theta_1$, $\theta_2$ and $\theta_3$ preferably satisfy Equation 1:

$$\theta_1 > \theta_2 > \theta_3 \quad (1)$$

however, considering the angles made by the first, second, and third mirror planes 80, 82, and 84 with respect to the optical axis of the incident light L, the obtuse angles $\theta_1$, $\theta_2$, and $\theta_3$ may be the same. In this case, the first, second, and third dichroic prisms 79, 81, and 83 have the same size. Also, the first, second, and third color beams $L_1$, $L_2$, and $L_3$ in such a range as shown in FIG. 4, among the first, second, and third color beams $L_1$, $L_2$, and $L_3$ reflected by the first, second, and third mirror planes 80, 82, and 84, respectively, are used as effective beams and the rest is not used.

The light pipe 70 of FIG. 4 is suitable for an image projector that uses as an image producing means a micromirror device (not shown) or the like which can produce an image regardless of the polarization direction of incident light.

Preferably, the light pipe 70 further includes a condensing lens 71 for condensing the incident light L, in front of a light incidence plane of the first dichroic prism 79.

Figure 5:
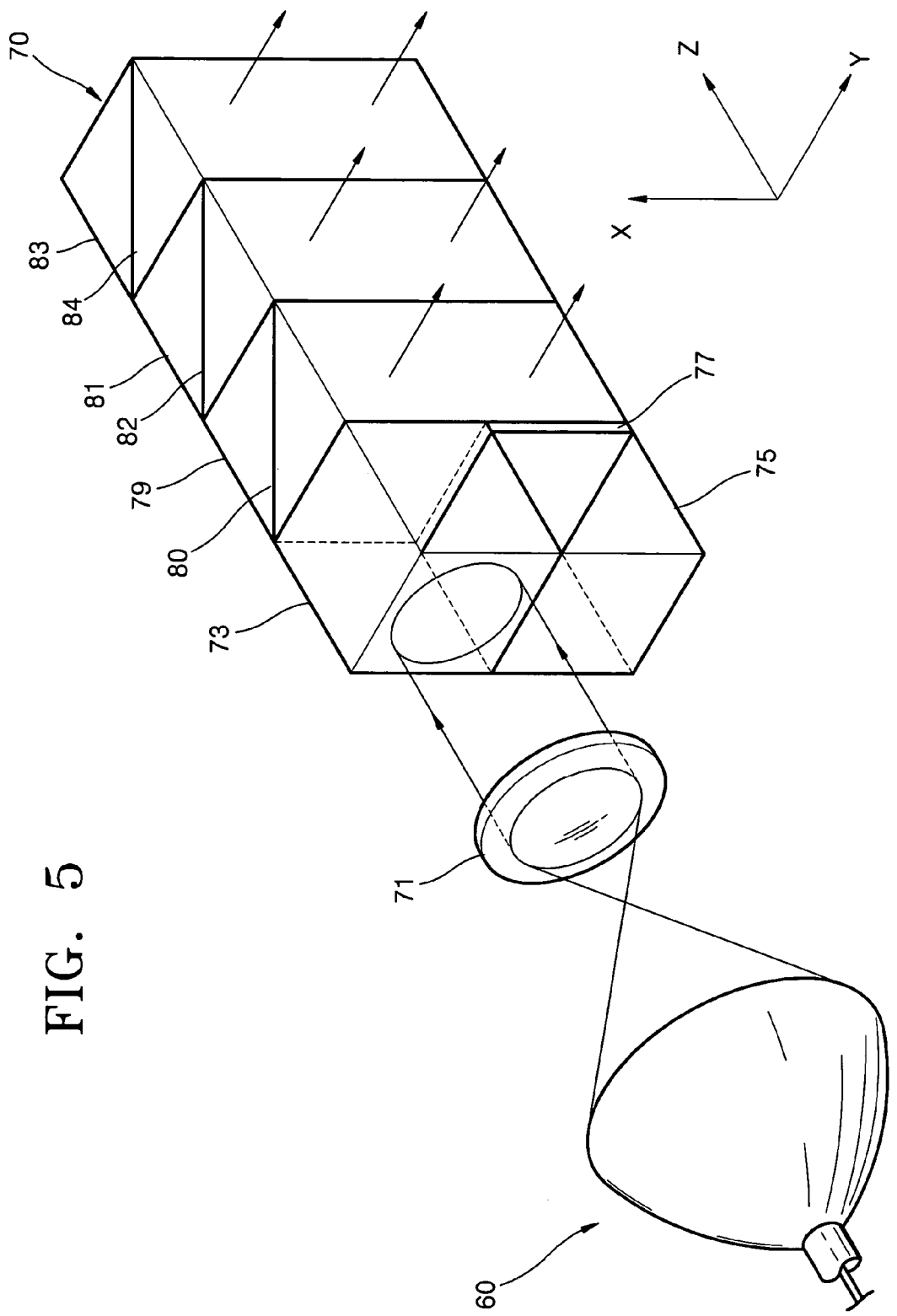
FIG. 5 is a schematic perspective view of the optical source of FIG. 3 and an optical configuration of a modification of the light pipe of FIG. 4.
Figure 6:
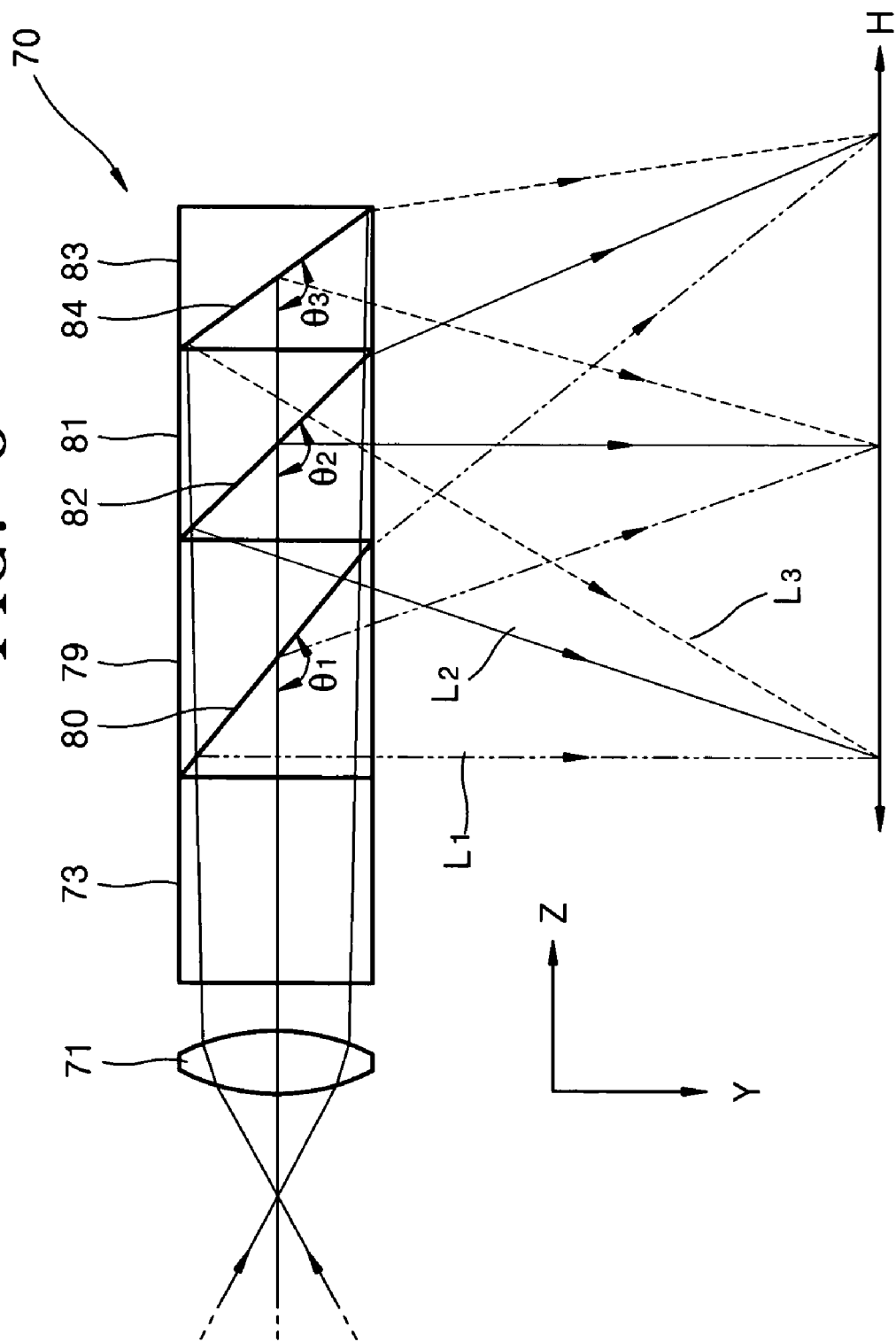
FIG. 6 is a top view of FIG. 5.
Figure 7:
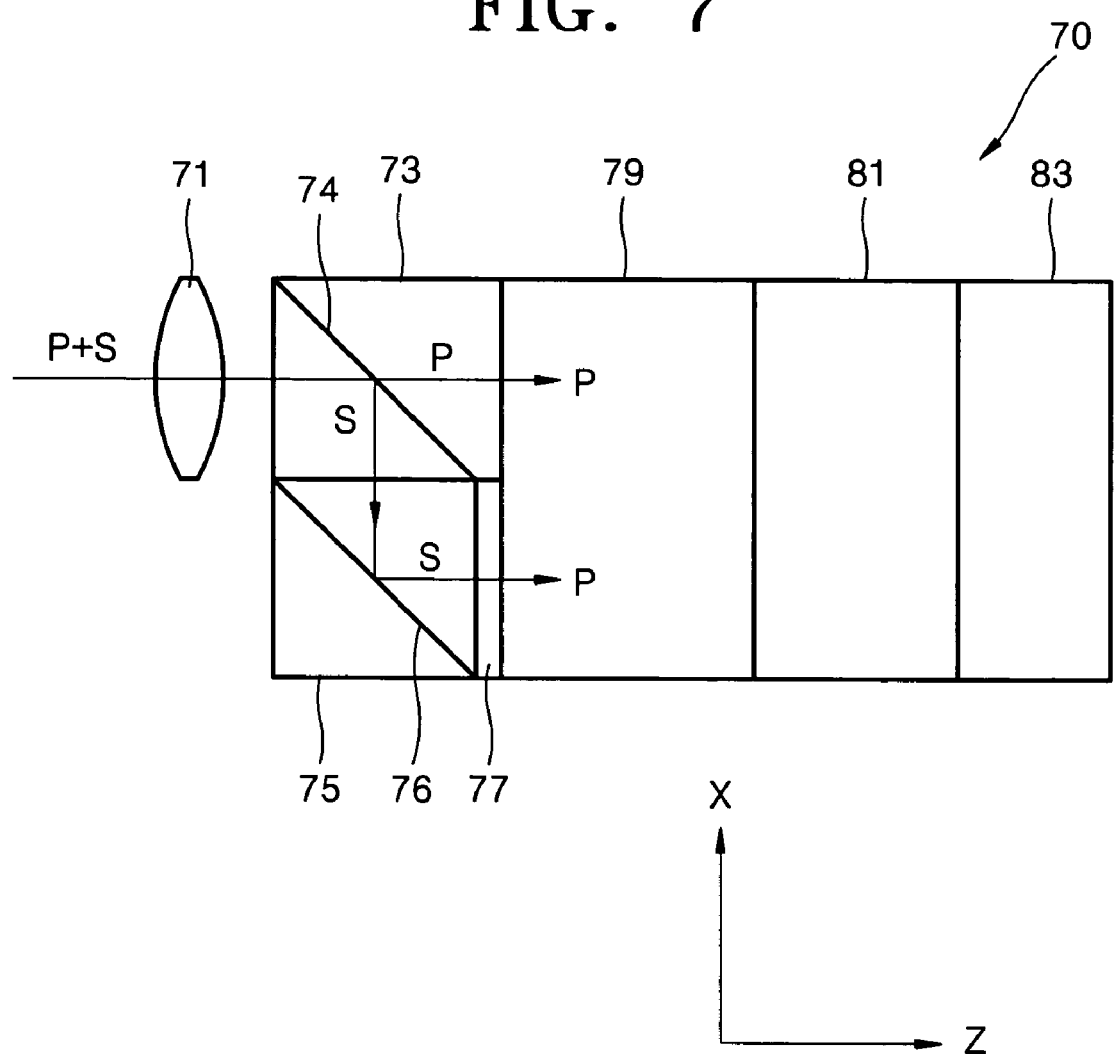
FIG. 7 is a front view of FIG. 5.
Figure 8:
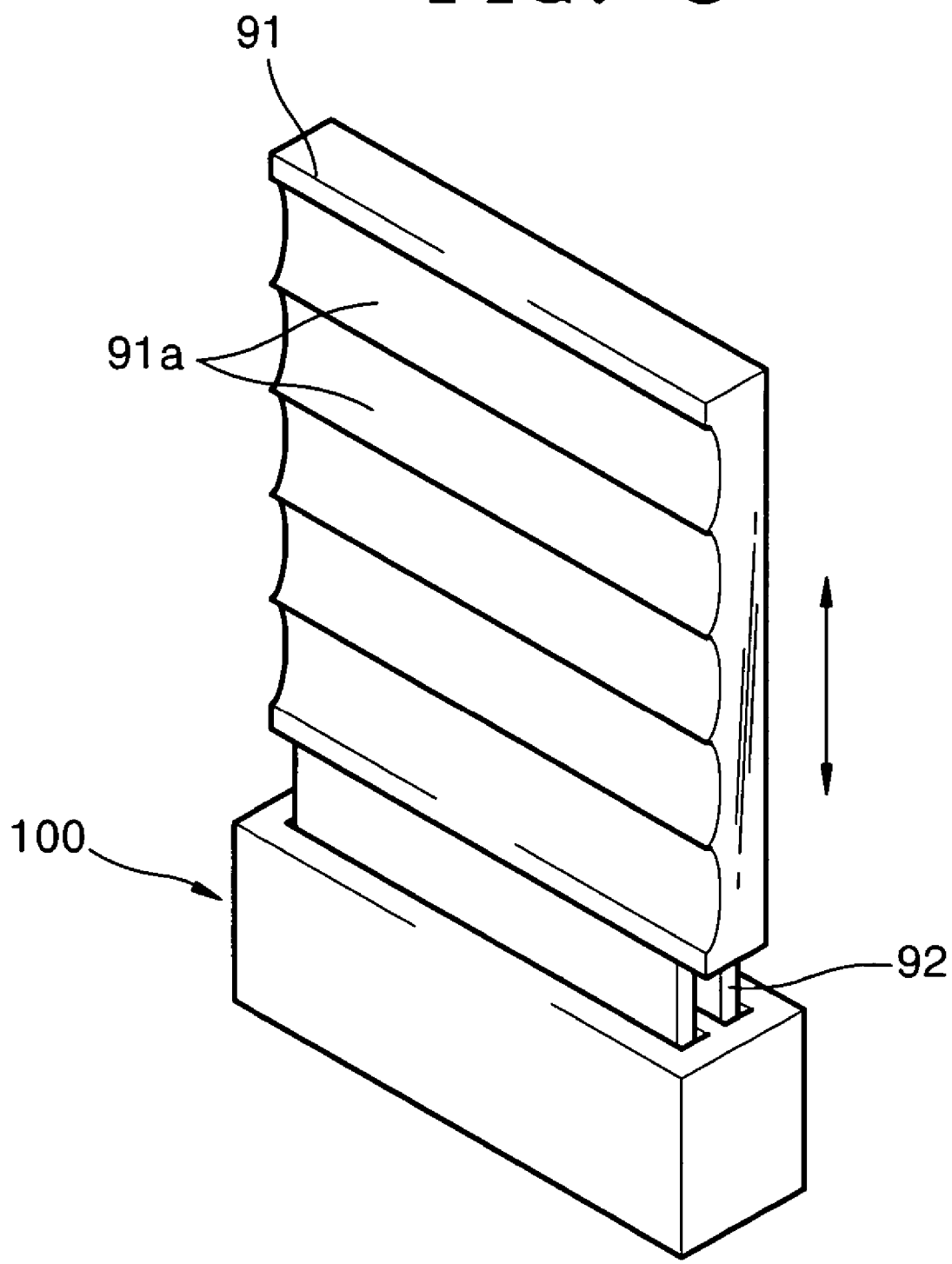
FIG. 8 is a perspective view showing a driving source and a cylindrical lens array that is used as the scrolling unit of FIG. 3.
Figure 9:
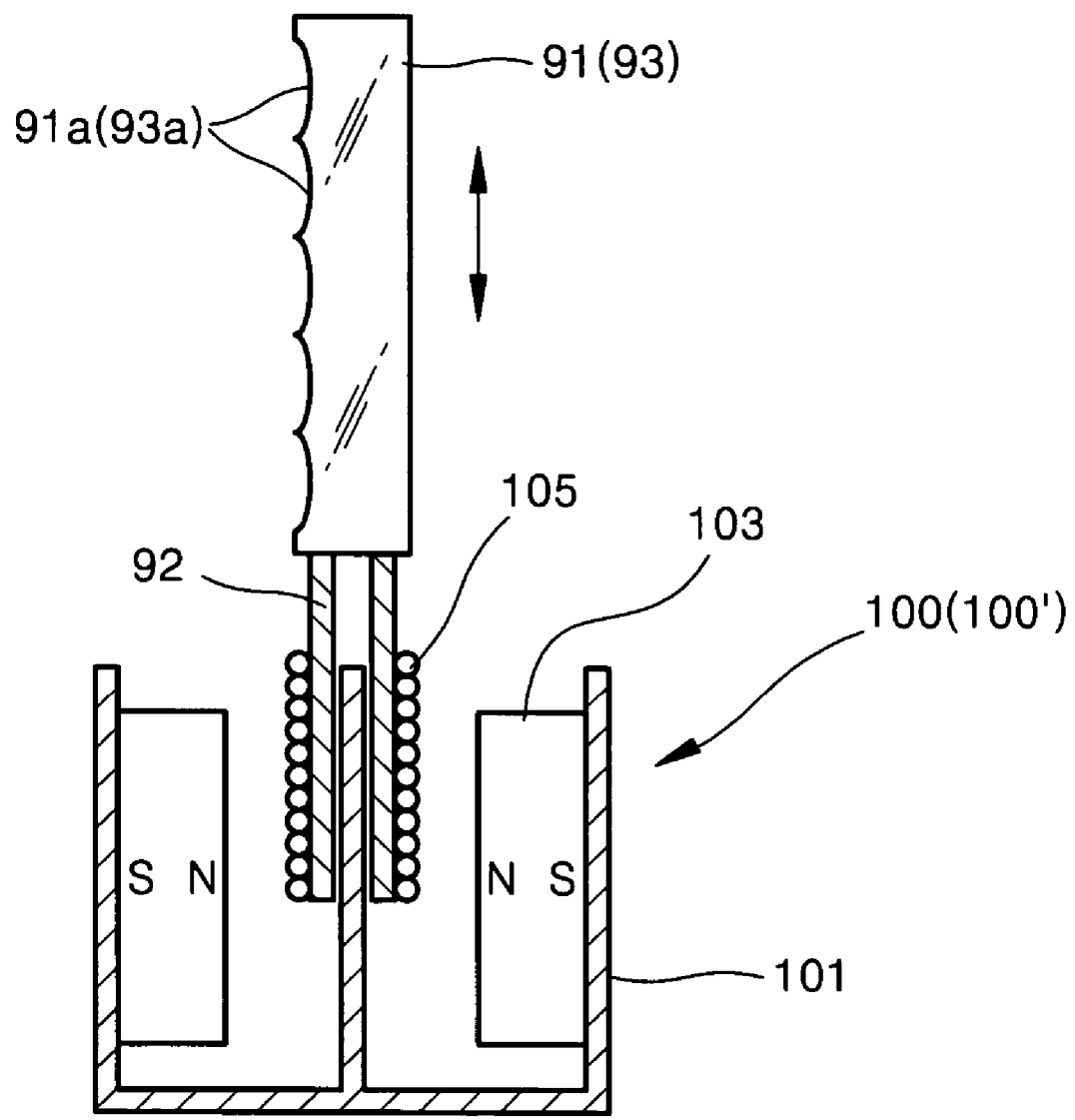
FIG. 9 is a cross-section of FIG. 8.

Referring to FIGS. 5 through 7, a modification of the light pipe 70 of FIG. 4 includes first and second polarized beam splitters 73 and 75, a ½ wavelength plate 77, and first, second, and third dichroic prisms 79, 81, and 83. Each of the first, second, and third dichroic prisms 79, 81, and 83 reflects light in a particular wavelength range and at the same time transmits light in other wavelength ranges so that incident light (L) can be separated into the first, second, and third color beams $L_1$, $L_2$, and $L_3$. The first, second, and third color beams $L_1$, $L_2$, and $L_3$ are focused on the image plane (H) of the first focusing lens 85 of FIG. 3 by the first, second, and third mirror planes 80, 82, and 84.

The first polarized beam splitter 73 is installed on a light incidence plane of the first dichroic prism 79, and transmits first light with one polarization direction among unpolarized white light toward the first dichroic prism 79 and at the same time reflects second light with the other polarization direction toward the second polarized beam splitter 75. To achieve this, a first polarization filter 74 is formed on a mirror plane of the first polarized beam splitter 73.

FIG. 7 illustrates an example in which unpolarized (P+S) white light is emitted from the light source 60 and the first polarization filter 74 transmits P-polarized light serving as the first light among the P+S white light and reflects S-polarized light serving as the second light.

Referring to FIG. 7, the second polarized beam splitter 75 re-reflects the S-polarized light reflected by the first polarized beam splitter 73 and advance the P-polarized light toward the first dichroic prism 79. Because the second polarized beam splitter 75 changes only the path of the S-polarized light without changing its polarization direction, the S-polarized light travels parallel to the P-polarized light transmitted by the first polarized beam splitter 75. To do this, the second polarized beam splitter 75 includes a second polarization filter 76 for reflecting light with one polarization direction, for example, S-polarized light, among the incident white light. The second polarized beam splitter 75 may be constituted with a total reflection mirror for total-reflecting an incident light beam.

The ½ wavelength plate 77 changes the phase of received light with one polarization direction by 90 degrees. In other words, the ½ wavelength plate 77 changes the received light with one polarization direction to light with the other polarization direction. In FIGS. 5 and 7, the ½ wavelength plate 77 is installed between the second polarized beam splitter 75 and the first dichroic prism 79 and changes the polarization direction of the received second light to that of the first beam. In other words, the ½ wavelength plate 77 changes the S-polarized light reflected by the second polarization filter 76 to P-polarized light.

Alternatively, the ½ wavelength plate 77 may be installed between the first polarized beam splitter 73 and the first dichroic prism 79 so as to change the polarization direction of a received first beam to that of the second beam.

Since the first, second, and third dichroic prisms 79, 81, and 83 were already described above with reference to FIG. 4, they will not be described here.

Preferably, the light pipe 70 of FIG. 7 further includes the condensing lens 71 for condensing unpolarized incident white light, in front of a light incidence plane of the first polarized beam splitter 73.

The light pipe 70 having such a structure as shown in FIGS. 5 through 7 can be used in a projection system, to be described later, which adopts a liquid crystal display as an image producing means.

In contrast with what was described above, each of the first, second, and third dichroic prisms 79, 81, and 83 may transmit a beam of a particular color and at the same time reflect beams of other colors. Also, the optical arrangement of the first, second, and third dichroic prisms 79, 81, and 83 may be changed. Since the manufacturing process of the first, second, and third dichroic prisms 79, 81, and 83 is well known in the field of optical applications, it will not be described here.

Referring back to FIG. 3, the first focusing lens 85 focuses beams into which incident light has been separated by the first, second, and third dichroic prisms 79, 81, and 83. To do this, the first focusing lens 85 is preferably a cylindrical lens.

Alternatively, the first focusing lens 85 may be an optical diffraction element which is a flat plate on which a diffraction pattern is formed such that beams traveling in an identical direction are focused. Since the structure and manufacturing process of a lens whose diffraction pattern causes incident light to be converged or diverged are widely known, they will not be described here.

The scrolling unit 90 includes a first cylindrical lens array 91 and a first driving source 100. The first cylindrical lens array 91 is formed of a plurality of cylindrical lenses 91a, which are disposed adjacent to one another and have identical refractive power. The cylindrical lenses 91a independently converge or diverge incident light. As shown in FIG. 3, the cylindrical lenses 91a are concave so as to diverge incident light. However, the cylindrical lenses 91a may be formed by forming a diffraction pattern on a flat plate.

Preferably, the scrolling unit 90 further includes a second cylindrical lens array 93 and a second driving source 100' for driving the second cylindrical lens array 93. The second cylindrical lens array 93 is installed on the path of light transmitted by the first cylindrical lens array 91 and cooperates with the first cylindrical lens array 91 in order to scroll incident light. Similar to the first cylindrical lens array 91, the second cylindrical lens array 93 is formed of a plurality of cylindrical lenses 93a, which are disposed adjacent to one another and have identical refractive power. The cylindrical lenses 93a independently converge or diverge incident light. As shown in FIG. 3, the cylindrical lenses 93a are concave so as to diverge incident light. However, the cylindrical lenses 93a may be a flat plate on which a diffraction pattern is formed.

The first and second driving sources 100 and 100' drive the first and second cylindrical lens arrays 91 and 93, respectively, so that light transmitted by the first and second cylindrical lens arrays 91 and 93 can form color bars and that the color bars can be scrolled. Thus, the color bars are formed at different locations on an image producing means 130 to be described later and scrolled. For example, beams of three colors R, G, and B land downward on different areas of the image producing means 130 in a G, R, and B order, then in an R, B, and G order, and finally in a B, G, and R order. This pattern repeats. A driving unit 140 may be either a voice coil motor or a piezoelectric driver that is driven according to a piezoelectric principle.

Preferably, the color illumination system according to the first embodiment of the present invention shown in FIG. 3 further includes a second focusing lens 87, a fly-eye lens 110, and a relay lens 120 in consideration of the focal point location and uniformity of light transmitted by the scrolling unit 90. The relay lens 120 delivers light to a predetermined location while maintaining the size of the light constant.

The second focusing lens 87 re-focuses the light transmitted by the scrolling unit 90. Preferably, the second focusing lens 87 is a cylindrical lens designed to focus beams that travel in an identical direction among incident beams. Alternatively, the second focusing lens 87 may be an optical diffraction element which is a flat plate on which a diffraction pattern is formed such that beams traveling in an identical direction are focused.

The fly-eye lens array 110 is installed on a light path between the second focusing lens 87 and the relay lens 120 and cooperates with the relay lens 120 so that color bar arrays formed on the fly-eye lens array 110 are focused on different color areas of a predetermined element, that is, a light valve 130. Also, the fly-eye lens array 110 equalizes the intensities of beams applied to the light valve 130. To achieve this, the fly-eye lens array 110 includes a first fly-eye lens 111, which has a plurality of convex portions 111a arranged two-dimensionally on its incidence or emission plane, and a second fly-eye lens 113, which is installed adjacent to the first fly-eye lens 111 and has a plurality of convex portions 113a arranged two-dimensionally on the incidence or emission plane of the second fly-eye lens 113.

The relay lens 120 delivers light transmitted by the fly-eye lens array 110 to a predetermined location, for example, the light valve 130.

The operation of the color illumination system according to the first embodiment of the present invention having such a configuration will now be described with reference to FIGS. 3 and 10 through 12.

Figure 10:
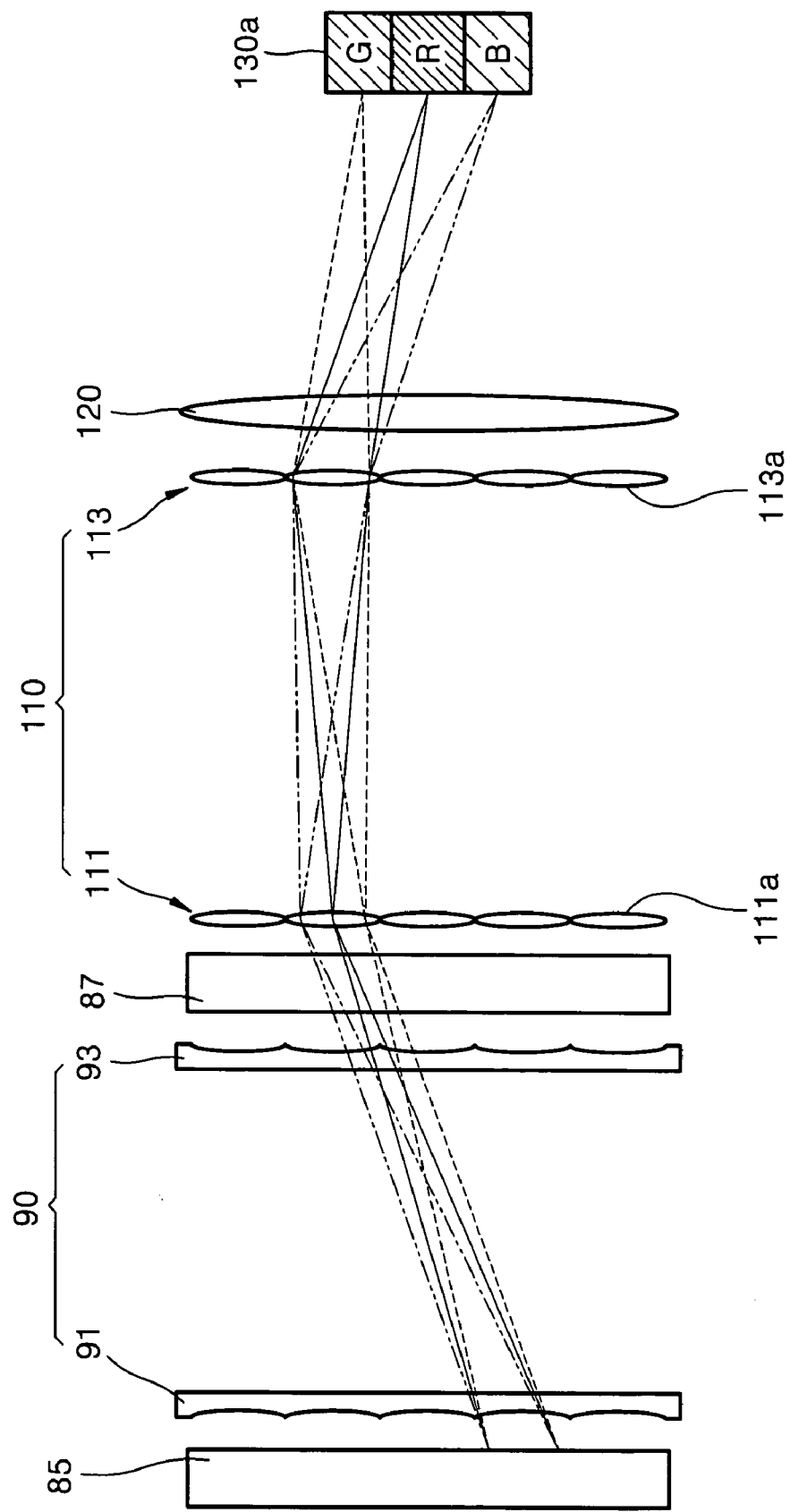
FIGS. 10, 11, and 12 are schematic views for illustrating an operation of the color illumination system of FIG. 3.

FIG. 10 shows an arrangement of the first and second cylindrical lens arrays 91 and 93 created due to the driving of the first and second driving sources 100 and 100' of FIG. 3. In this case, color beams with different wavelengths, into which light has been separated by the light pipe 70 of FIG. 3, are focused on the first focusing lens 85. The focused beam is re-separated into several beams by the first cylindrical lens array 91. The separated beams pass through the second cylindrical lens array 93, the second focusing lens 87, the fly-eye lens array 110, and the relay lens 120 and forms color bars on different color areas of the light valve 130 of FIG. 3. The formed color bars are arranged downward in the order of G, R, B as indicated by reference numeral 130a. As described above, different color bars can land on different color areas of the light valve 130.

Preferably, a focal distance formed by the first and second focusing lenses 85 and 87 and the first and second cylindrical lens arrays 91 and 93 is set so that, when parallel beams are incident upon the first focusing lens 85, beams emitted from the second focusing lens 87 can be focused on the first fly-eye lens 111. The focal distance is determined due to an adequate selection of the refractive power of each of the first and second focusing lenses 85 and 87 and the first and second cylindrical lens arrays 91 and 93. Since this focal distance determination method is well known, it will not be described here in greater detail.

Figure 11:
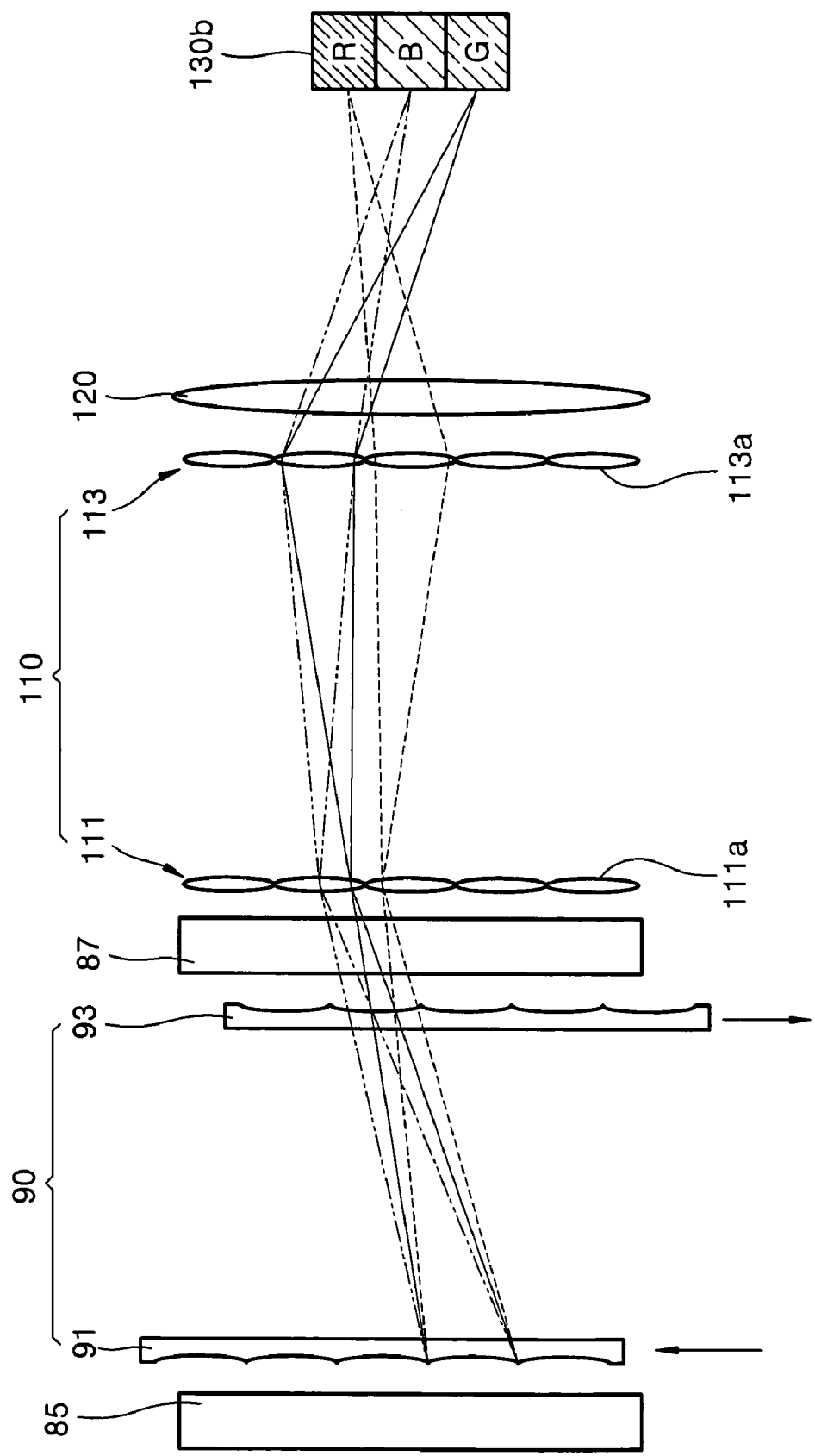

FIG. 11 shows another arrangement of the first and second cylindrical lens arrays 91 and 93 created due to the driving of the first and second driving sources 100 and 100' of FIG. 3. Compared with FIG. 10, the first cylindrical lens array 91 of FIG. 11 is disposed higher than the location of the first cylindrical lens array 91 of FIG. 10, and the second cylindrical lens array 93 is disposed lower than the location of the second cylindrical lens array 93 of FIG. 10. In this case, color bars are formed downward in the order of R, B, and G as indicated by reference numeral 130b.

Figure 12:
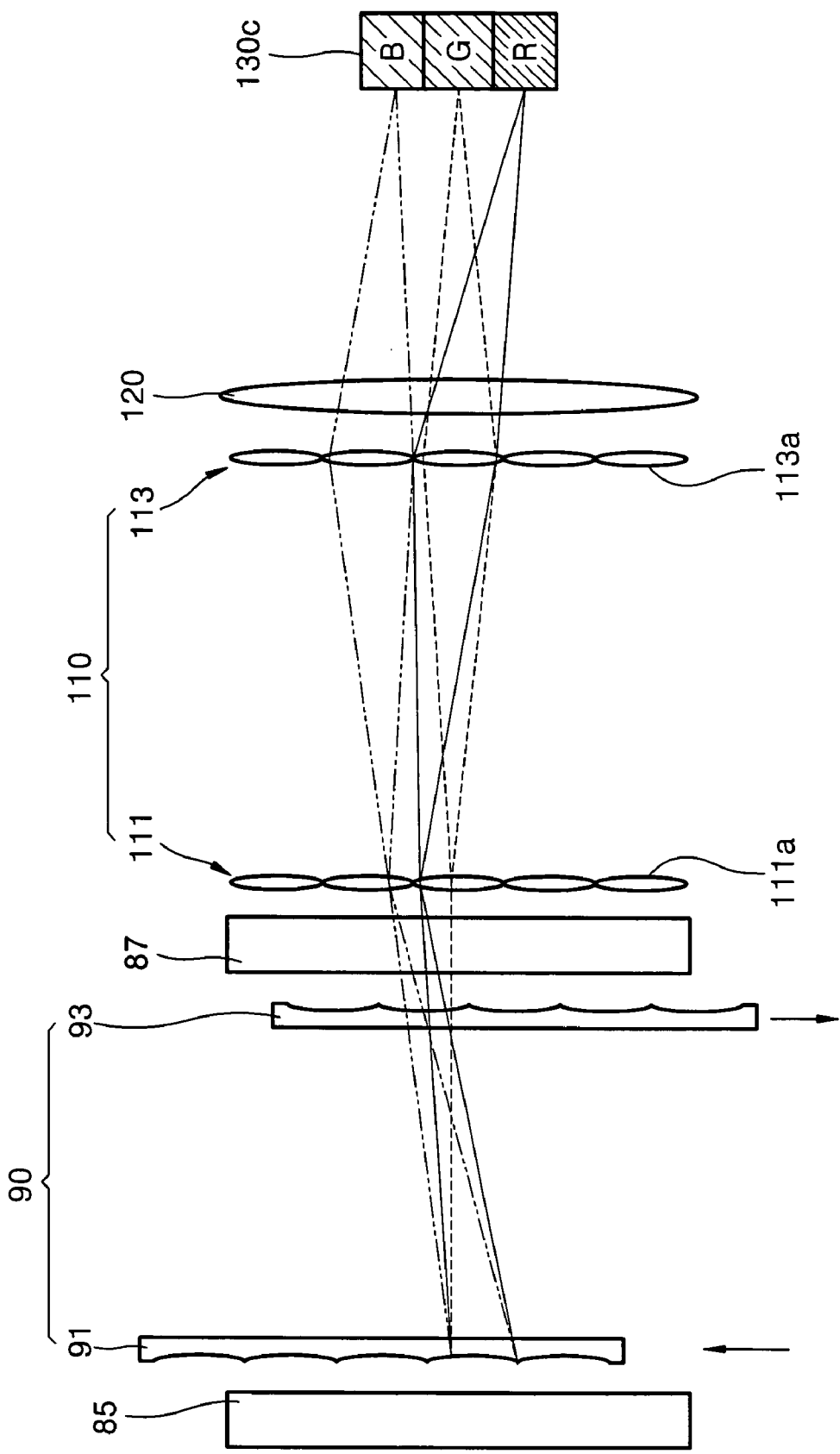

FIG. 12 shows still another arrangement of the first and second cylindrical lens arrays 91 and 93 created due to the driving of the first and second driving sources 100 and 100' of FIG. 3. Compared with FIGS. 10 and 11, the first cylindrical lens array 91 of FIG. 12 is disposed higher than the first cylindrical lens array 91 of FIG. 11, and the second cylindrical lens array 93 of FIG. 12 is disposed lower than the second cylindrical lens array 93 of FIG. 11. In this case, color bars are formed downward in the order of B, G, and R as indicated by reference numeral 130c.

The pattern of the color bar arrangements 130a, 130b, and 130c is repeated by repeating a pattern of the three arrangements of the first and second cylindrical lens arrays 91 and 93 shown in FIGS. 10 through 12.

Referring back to FIG. 3, the projection system according to the first embodiment of the present invention is constituted with the above-described color illumination system, the light valve 130, and a projection lens unit 140. The light valve 130 produces an image from beams received via the fly-eye lens array 110. The projection lens unit 140 magnifies the image and projects the magnified image onto a screen 150.

As described above, the color illumination system according to the first embodiment of the present invention includes the light source 60 for generating and projecting light, the light pipe 70 for separating incident light according to a wavelength range, the first and second focusing lenses 85 and 87, the scrolling unit 90, and the fly-eye lens array 110. Since the structure and function of each of the component elements of the color illumination system according to the first embodiment of the present invention and the arrangement of these component elements were already described above with reference to FIGS. 3 through 12, they will not be described here.

The light valve 130 is installed at a location where color bars scrolled by the scrolling unit 90 land. R, G, and B beams are incident upon effective image areas of the light valve 130 while being scrolled, thus forming color bars.

As shown in FIG. 3, the light valve 130 is a transmissive liquid crystal display. In this case, the transmissive liquid crystal display produces an image by each pixel that either transmits or blocks an incident beam.

Alternatively, the light valve 130 may be a reflective liquid crystal display or a micro-mirror device whose individual pixels reflect their incident beams along different paths. In this case, an optical element, such as, a beam splitter (not shown), for advancing the image formed by the light valve 130 toward the screen 150 may be further installed on a light path. Since the structure and function of the light valve 130 are well known, they will not be described in greater detail.

The projection lens unit 140 is installed between the light valve 130 and the screen 150 and magnifies incident light and projects the magnified light onto the screen 150.

Figure 13:
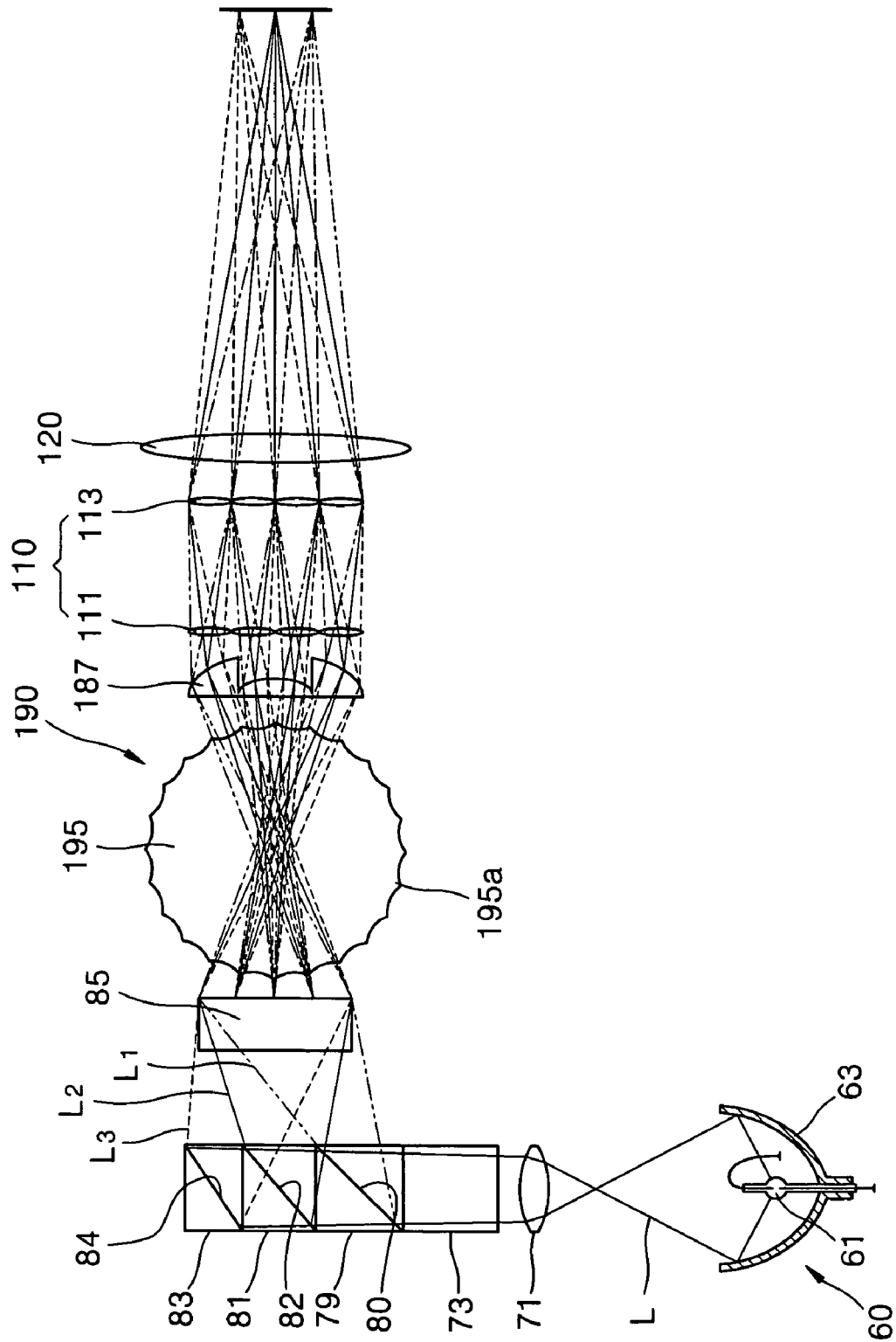
FIG. 13 is a schematic view of an optical configuration of a modification of the color illumination system of FIG. 3.

FIG. 13 shows an optical configuration of a modification of the color illumination system of FIG. 3. The modified color illumination system includes the light source 60, the light pipe 70, the first focusing lens 85, and a scrolling unit 190. Since the light source 60, the light pipe 70, and the first focusing lens 85 were already described above, they will not be described here in detail.

Figure 14:
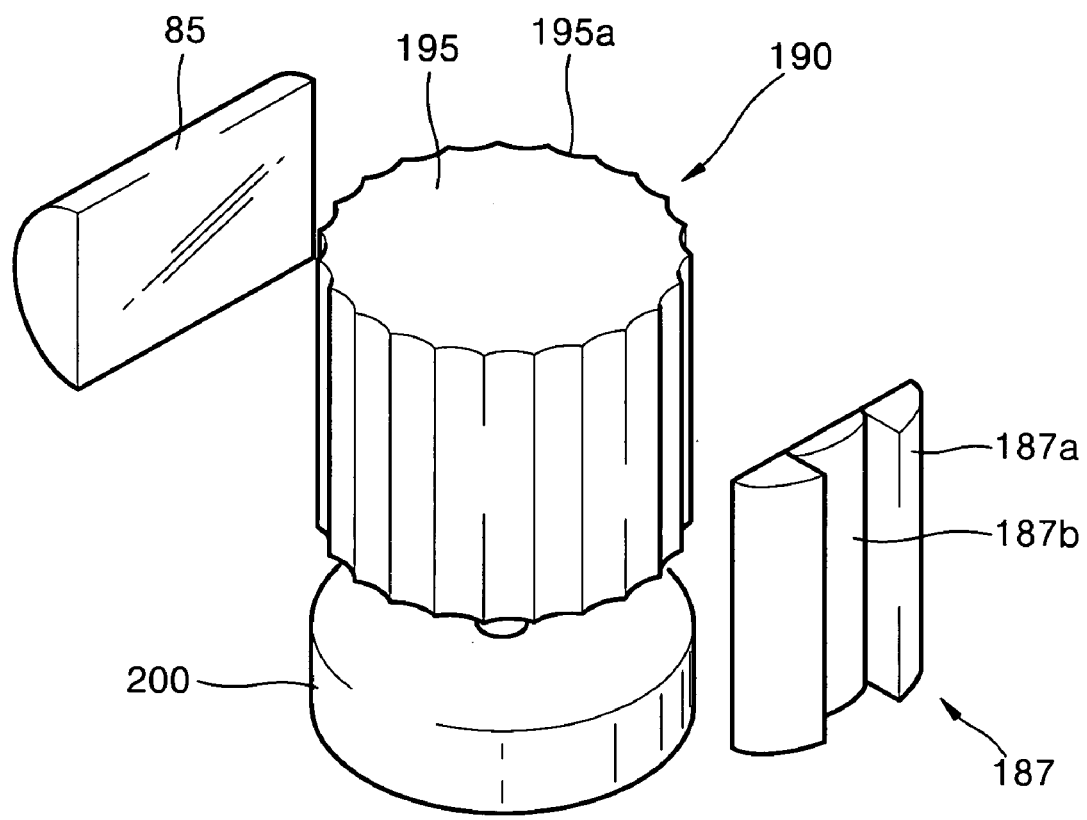
FIG. 14 is a schematic perspective view of major elements extracted from FIG. 13.

The modified color illumination system is different from the color illumination system of FIG. 3 in having the scrolling unit 190. Referring to FIGS. 13 and 14, the scrolling unit 190 is constituted with a revolving cylindrical lens array 195, which is rotatably installed on the light path, and a driving source 200, which rotates the revolving cylindrical lens array 195.

The revolving cylindrical lens array 195 has a cylindrical shape. A plurality of cylindrical lenses 195a having an identical refractive power are arranged on the outer circumference of the revolving cylindrical lens array 195 such as to be adjacent to one another. The cylindrical lenses 195a independently converge or diverge incident light. The cylindrical lenses 195a are geometrically concave. The revolving cylindrical lens array 195 may be a flat plate on which a diffraction pattern is formed so as to converge or diverge incident light.

The driving source 200 is a typical rotation-driving device, such as, a motor. Since the structure of the typical rotation-driving device is widely known, it will not be described in greater detail.

As described above, the scrolling unit 190 adopts the revolving cylindrical lens array 195 so as to consecutively scroll separated color bars in contrast with the scrolling unit 90 included in the color illumination system of FIG. 3.

Preferably, the modified color illumination system of FIG. 13 further includes a second focusing lens 187, the fly-eye lens array 110, and the relay lens 120.

As shown in FIG. 14, the second focusing lens 187 is disposed opposite to some of the cylindrical lenses 195a of the revolving cylindrical lens array 195 and basically has a shape of a half cylinder as the first focusing lens 85. The second focusing lens 187 is constituted with first and second portions 187a and 187b, which have different curvatures. As shown in FIG. 14, the first portion 187a corresponds to either outer portion of the second focusing lens 187, and the second portion 187b corresponds to a portion in between the outer portions of the second focusing lens 187. Because the first and second portions 187a and 187b have different curvatures, both beams transmitted by the first portion 187a and beams transmitted by the second portion 187b can be focused on the same plane.

Referring back to FIG. 13, the fly-eye lens array 110 is installed on a light path between the second focusing lens 187 and the relay lens 120. Since the structure and function of the fly-eye lens array 110 were already described above, they will not be described in greater detail.

Figure 15:
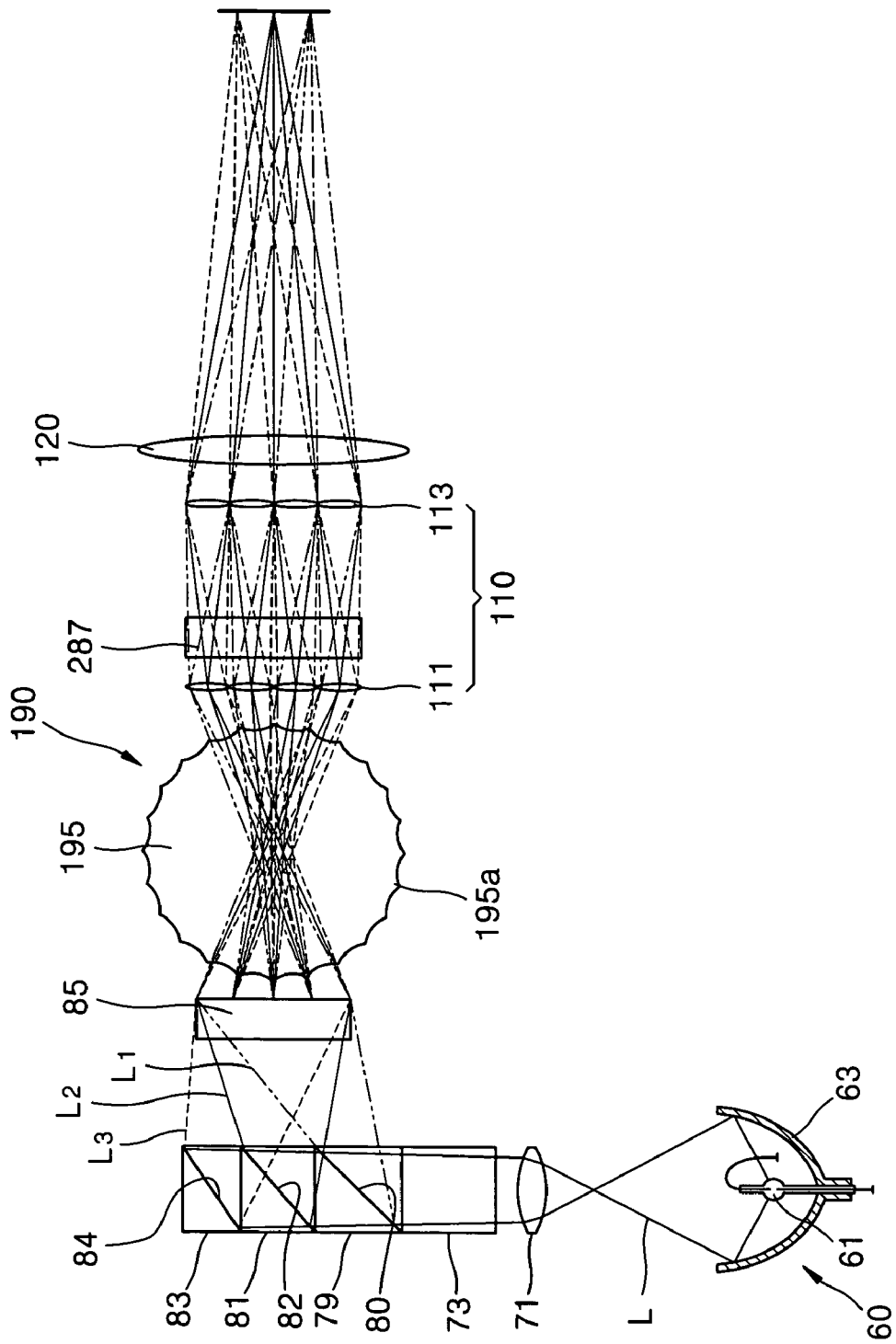
FIG. 15 is a schematic view of an optical configuration of another modification of the color illumination system of FIG. 3.

FIG. 15 is a schematic view of an optical configuration of another modification of the color illumination system of FIG. 3. Referring to FIG. 15; the modified color illumination system includes the light source 60, the light pipe 70, the first focusing lens 85, the scrolling unit 190, a second focusing lens 287, the fly-eye lens array 110, and the relay lens 120. Since the structures and functions of the light source 60, the light pipe 70, the first focusing lens 85, and the scrolling unit 190 were already described above, they will not be described in greater detail.

The modified color illumination system of FIG. 15 is characterized in that the second focusing lens 187 is installed at a location different from that of the modified color illumination system of FIG. 13. In other words, in the modified color illumination system of FIG. 15, the second focusing lens 187 is installed between the first and second fly-eye lens 111 and 113 of the fly-eye lens array 110.

The projection system according to the first embodiment of the present invention may be constituted with the color illumination system of FIG. 13 or 15, the light valve 130 for producing an image from light received from the fly-eye lens array 110, and the projection system unit 140 for magnifying the image formed on the light valve 130 and projecting the magnified image onto the screen 50. The color illumination systems of FIGS. 13 and 15 are different from the color illumination system of FIG. 3 in adopting the scrolling unit 190. Since the scrolling unit 190 adopts the revolving cylindrical lens array 195 and the driving source 200 for driving the revolving cylindrical lens array 195 and scrolls color bars, the scrolling unit 190 can be easily synchronized with the light valve 130.

Figure 16:
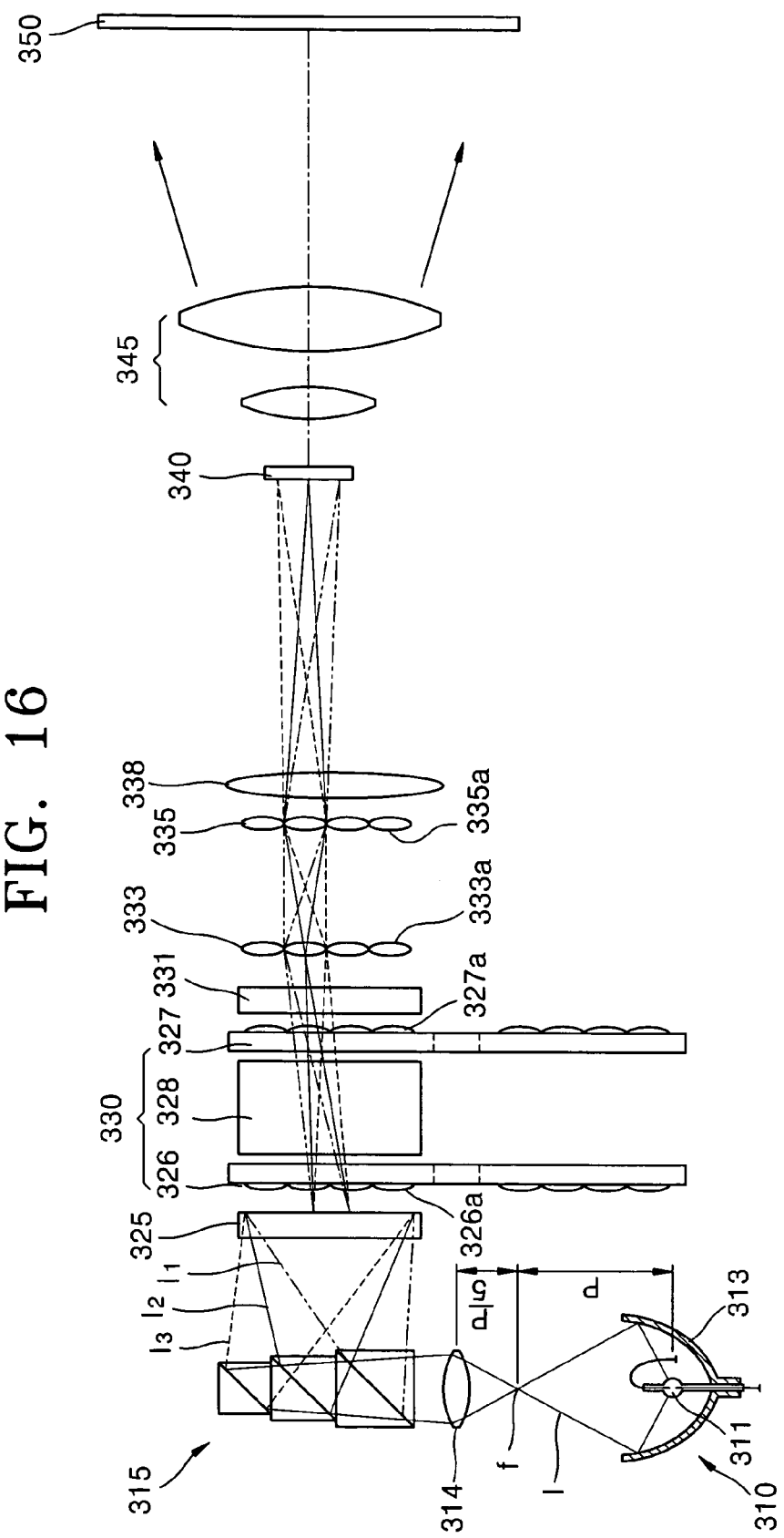
FIG. 16 shows an optical configuration of a projection system according to a second embodiment of the present invention adopting a light pipe according to a second embodiment of the present invention.

FIG. 16 shows an optical configuration of a projection system according to a second embodiment of the present invention adopting a light pipe according to a second embodiment of the present invention. Referring to FIG. 16, the projection system according to the second embodiment of the present invention includes a light source 310, a light pipe 315, a scrolling unit 330, a light valve 340, and a projection lens unit 345. The light pipe 315 separates light emitted from the light source 310, according to color. The scrolling unit 330 scrolls R, G, and B beams, into which the light emitted form the light source 310 has been separated by the light pipe 315. The light valve 340 forms an image by processing the scrolled beams according to an image signal. The projection lens unit 355 magnifies the image and projects the magnified image onto a screen 350.

The light source 310 produces and emits white light and includes a lamp 311 for generating light and a reflection mirror 313 for reflecting the light emitted from the lamp 311 and guiding the reflected light. The reflection mirror 313 may be an elliptic mirror whose first focal point is the position of the lamp 311 and a second focal point is a point where light is focused. Alternatively, the reflection mirror 313 may be a parabolic mirror which uses the lamp 311 as a focal point and is designed so that light beams that are emitted from the lamp 311 and reflected by the parabolic mirror are collimated. The reflection mirror 313 shown in FIG. 16 is an elliptic mirror. When a parabolic mirror is used as the reflection mirror 313, a lens for focusing light must be further included.

A collimating lens 314 for collimating incident light is installed on a light path between the light source 310 and the light pipe 315. Preferably, given that P denotes the distance between the light source 310 and the focal point f where light emitted from the light source 310 is focused, the collimating lens 314 is installed P/5 apart from the focal point f. By installing a projection system in this way, the structure of an optical system can be made more compact.

Figure 17:
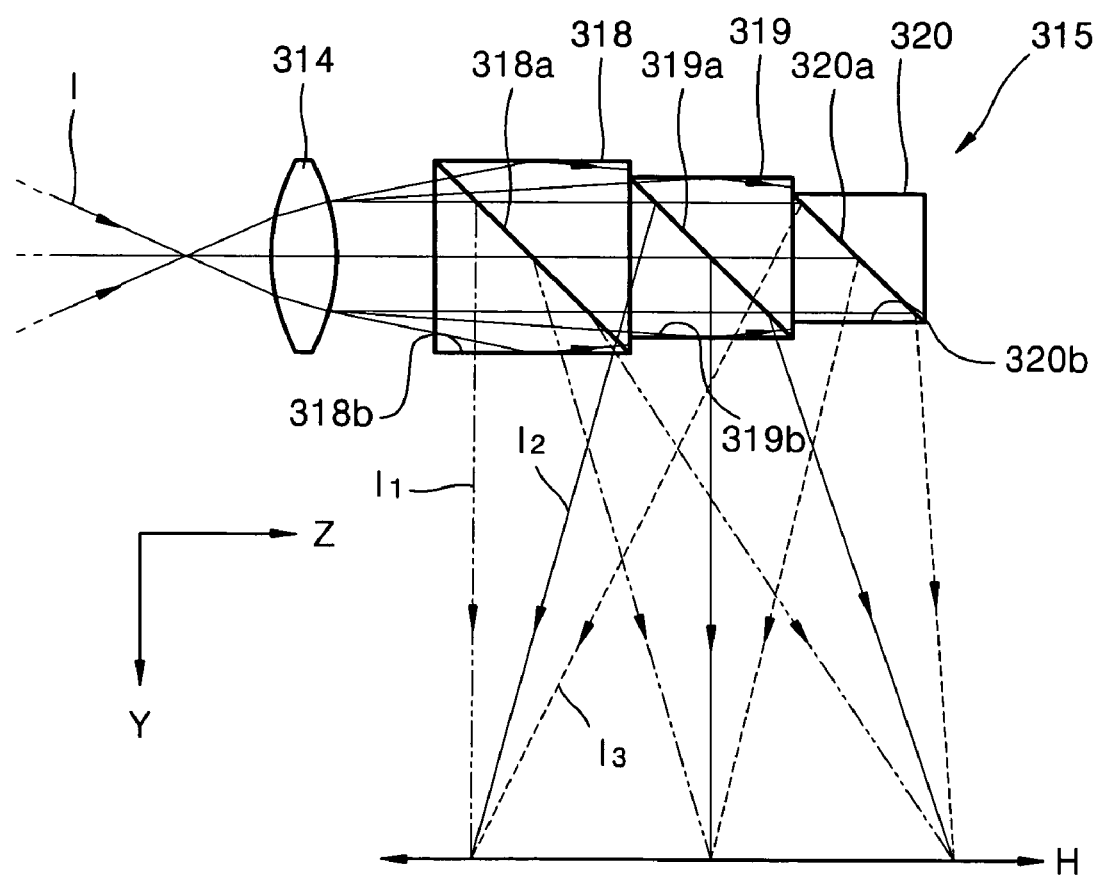
FIG. 17 is a top view of the light pipe of FIG. 16.

As shown in FIG. 17, the light pipe 315 according to the second embodiment of the present invention includes first, second, and third dichroic prisms 318, 319, and 320. The first dichroic prism 318 has a first dichroic mirror plane 318a for reflecting an incident beam of a particular color and transmitting incident beams of the other colors. The second dichroic prism 319 is installed on the path of light transmitted by the first dichroic prism 318 and has a second dichroic mirror plane 319a for reflecting an incident beam of a particular color and transmitting incident beams of the other colors. The third dichroic prism 320 is installed on the path of light transmitted by the second dichroic mirror plane 319a and has a third dichroic mirror plane 320a for reflecting an incident beam of a particular color and transmitting incident beams of the other colors. When the sizes of the first, second, and third dichroic mirror planes 318a, 319a, and 320a are $S_1$, $S_2$, and $S_3$, respectively, at least two of the sizes $S_1$, $S_2$, and $S_3$ are different. For example, the first, second, and third dichroic mirror planes 318a, 319a, and 320a can have sizes that satisfy a relationship, $S_1 \geq S_2 > S_3$ or $S_1 > S_2 \geq S_3$, or its inverse relationship, $S_1 < S_2 \leq S_3$ or $S_1 \leq S_2 < S_3$.

The light pipe 315 is constituted with the first, second, and third dichroic prisms 318, 319, and 320. Preferably, the light pipe 315 having such a structure includes total reflection planes 318b, 319b, and 320b for total-reflecting light that is incident at a predetermined angle, that is, a critical angle or greater. The total reflection planes 318b, 319b, and 320b are provided on external planes of the first, second, and third dichroic prisms 318, 319, and 320 other than the incidence and emission planes thereof.

The total reflection planes 318b, 319b, and 320b reduce a loss in light that travels within the light pipe 315, thereby increasing light efficiency. Light that is incident upon the total reflection planes 318b, 319b, and 320b after being reflected at least one time within the first, second, and third dichroic prisms 318, 319, and 320 is not total-reflected but transmitted because the incidence angle of the light is smaller than the critical angle.

As shown in FIG. 17, a first color beam $I_1$, for example, a red beam R, among incident white light I is reflected by the first dichroic prism 318, and second and third color beams $I_2$ and $I_3$ are transmitted thereby. The second color beam $I_2$, for example, a green beam G, is reflected by the second dichroic prism 319, and the third color beam $I_3$ is transmitted thereby. The third color beam $I_3$, for example, a blue beam B, is reflected by the third dichroic prism 320. In this way, the incident white light is separated into the first, second, and third color beams $I_1$, $I_2$, and $I_3$. Because the fist, second, and third dichroic mirror planes 318a, 319a, and 320a have different sizes, the first, second, and third color beams $I_1$, $I_2$, and $I_3$ with different amounts are reflected thereby. The third dichroic mirror plane 320a can be replaced by a total reflection mirror.

The projection system adopting the light pipe 315 according to the second embodiment of the present invention can adopt a deformable mirror device as the light valve 340.

Figure 18:
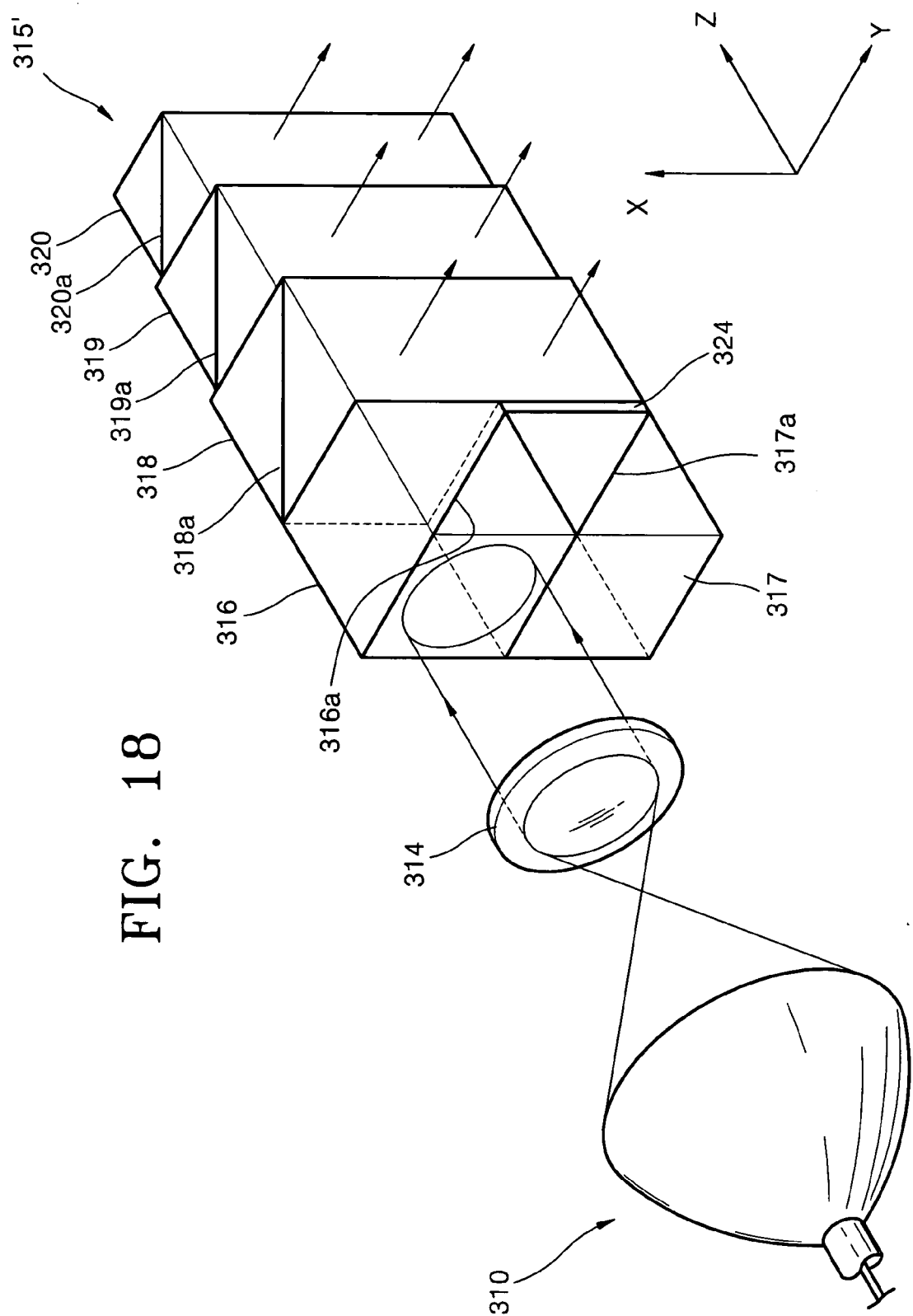
FIG. 18 is a perspective view of a modification of the light pipe of FIG. 16.
Figure 19:
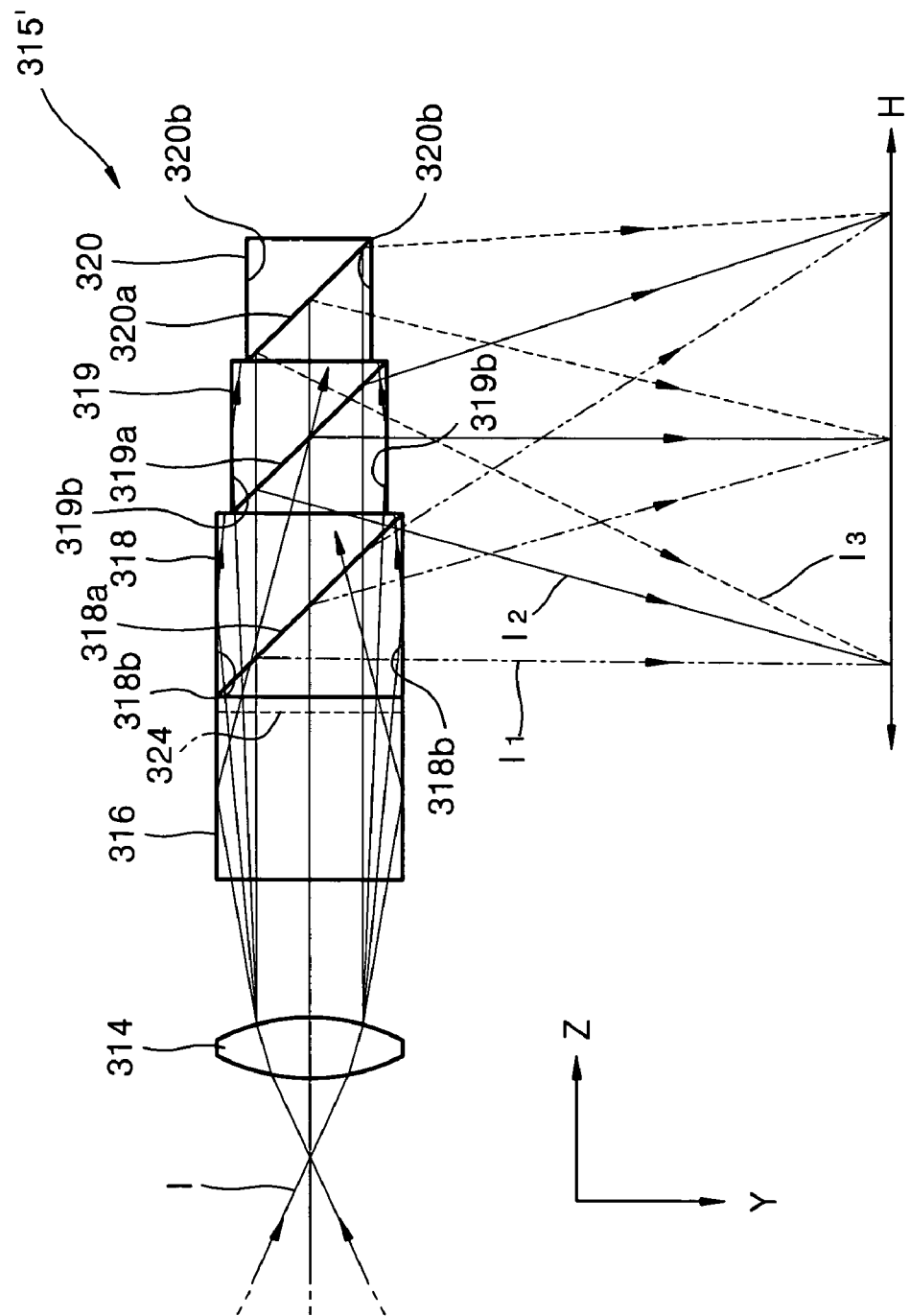
FIG. 19 is a top view of the light pipe of FIG. 18.

FIGS. 18 and 19 are a perspective view and a top view, respectively, of a modification of the light pipe 315 according to the second embodiment of the present invention. Referring to FIGS. 18 and 19, a light pipe 315', which is a modification of the light pipe 315, includes the first, second, and third dichroic prisms 318, 319, and 320 and first and second polarized beam splitters 316 and 317. The first and second polarized beam splitters 316 and 317 are installed in front of the first dichroic prism 318 and reflect light with one polarization direction among incident light and transmit light with the other polarization direction. Preferably, a ½ wavelength plate 324 for changing the polarization direction of incident light is installed between the first or second polarized beam splitter 316 or 317 and the first dichroic prism 318. In FIG. 18, the ½ wavelength plate 324 is disposed between the second polarized beam splitter 317 and the first dichroic prism 318.

The first polarized beam splitter 316 is installed on the light incidence plane of the first dichroic prism 318, and transmits first light with one polarization direction among unpolarized white light toward the first dichroic prism 318 and at the same time reflects second light with the other polarization direction toward the second polarized beam splitter 317. The first polarized beam splitter 316 includes a first polarization filter 316a, and the second polarized beam splitter 317 includes a second polarization filter 317a.

The second polarized beam splitter 317 re-reflects the second light reflected by the first polarized beam splitter 316 toward the first dichroic prism 318. Because the second polarized beam splitter 317 changes only the path of the second light without changing its polarization direction, the second beam travels parallel to the first light transmitted by the first polarized beam splitter 316. The second polarized beam splitter 317 may be replaced by a total reflection mirror for total-reflecting incident light.

The ½ wavelength plate 324 changes the received light with one polarization direction to light with the other polarization direction. FIGS. 18 and 19 show an example in which the ½ wavelength plate 324 is installed between the second polarized beam splitter 317 and the first dichroic prism 318 and changes the polarization direction of the received second light to that of that of the first beam. In other words, the ½ wavelength plate 324 changes S-polarized light reflected by the second polarization filter 317a to P-polarized light.

However, the ½ wavelength plate 324 may be installed between the first polarized beam splitter 316 and the first dichroic prism 318 so as to change the polarization direction of the received first light to that of the second light.

As described above, the light emitted from the light source 310 has a single polarization direction by using the first and second polarized beam splitters 316 and 317 and the ½ wavelength plate 324, and the light with the single polarization direction is separated into color beams by the first, second, and third dichroic prisms 318, 319, and 320. Since the first, second, and third dichroic prisms 318, 319, and 320 were described above with reference to FIG. 17, they will not be described here in greater detail.

The projection system adopting the light pipe 315' can use a liquid crystal display as the light valve 340.

Figure 20:
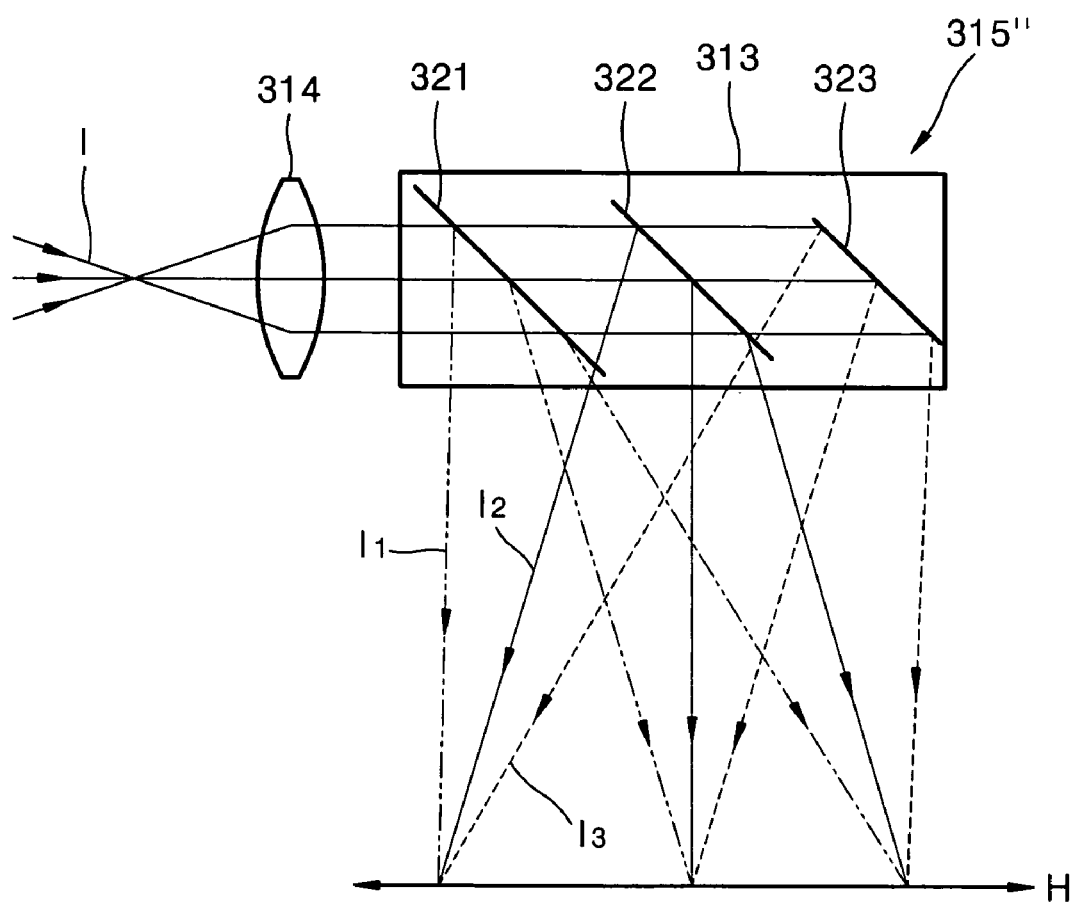
FIG. 20 is a top view of another modification of the light pipe of FIG. 16.

FIG. 20 is a top view of a light pipe 315", which is another modification of the light pipe 315 of FIG. 16. Referring to FIG. 20, the light pipe 315" includes a single prism 313 in which first, second, and third dichroic mirror planes 321, 322, and 323 re included. Preferably, at least two of the first, second, and third dichroic mirror planes 321, 322, and 323 have different sizes. When the sizes of the first, second, and third dichroic mirror planes 321, 322, and 323 are $A_1$, $A_2$, and $A_3$, respectively, they can satisfy a relationship, $A_1 \geq A_2 > A_3$ or $A_1 > A_2 \geq A_3$, for example. As shown in FIG. 18, the first and second polarized beam splitters 316 and 317 may be installed in front of the single prism 313. The ½ wavelength plate 324 may be installed between the first or second polarized beam splitter 316 or 317 and the single prism 313.

As shown in FIG. 20, white light I emitted from the light source 310 passes through the collimating lens 314 and is incident upon the light pipe 315". A first color beam $I_1$ among the incident white light I is reflected by the first dichroic mirror plane 321, and the other second and third color beams $I_2$ and $I_3$ are transmitted thereby. The second color beam $I_2$ is reflected by the second dichroic mirror plane 322, and the third color beam $I_3$ is transmitted thereby. The third color beam $I_3$ is reflected by the third dichroic mirror plane 323. Because the fist, second, and third dichroic mirror planes 321, 322, and 323 have different sizes, the first, second, and third color beams $I_1$, $I_2$, and $I_3$ with different amounts are reflected thereby.

As described above, each of the light pipes 315, 315', and 315" according to the first embodiment of the present invention can control the amount of each color light emitted therefrom, so the color temperature and color gamut of an image can be controlled.

The R, G, and B color beams $I_1$, $I_2$, and $I_3$, into which the white light has been separated by each of the light pipes 315, 315', and 315", are scrolled by the scrolling unit 330.

Figure 21A:
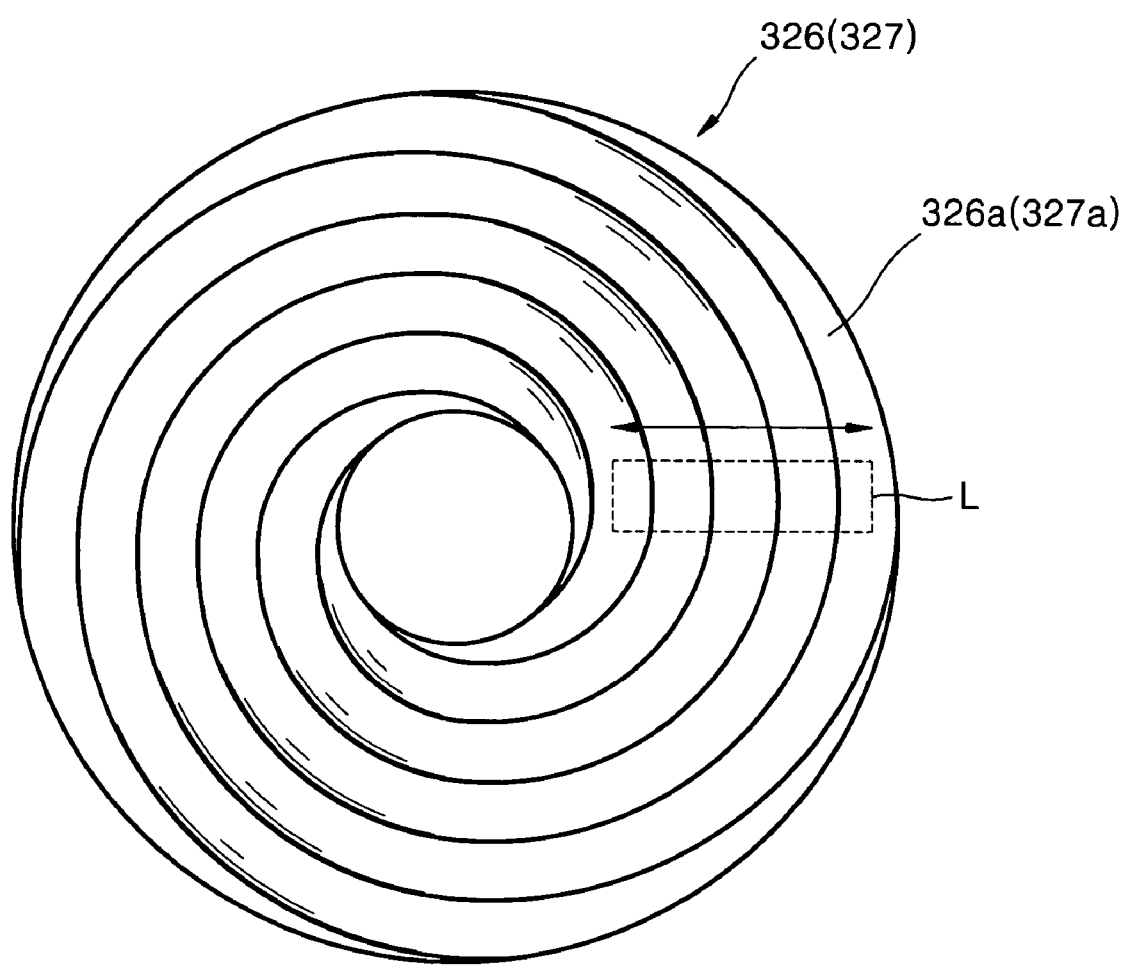
FIG. 21A is a front view of a spiral lens disk used in the scrolling unit adopted in the projection system of FIG. 16.
Figure 21B:
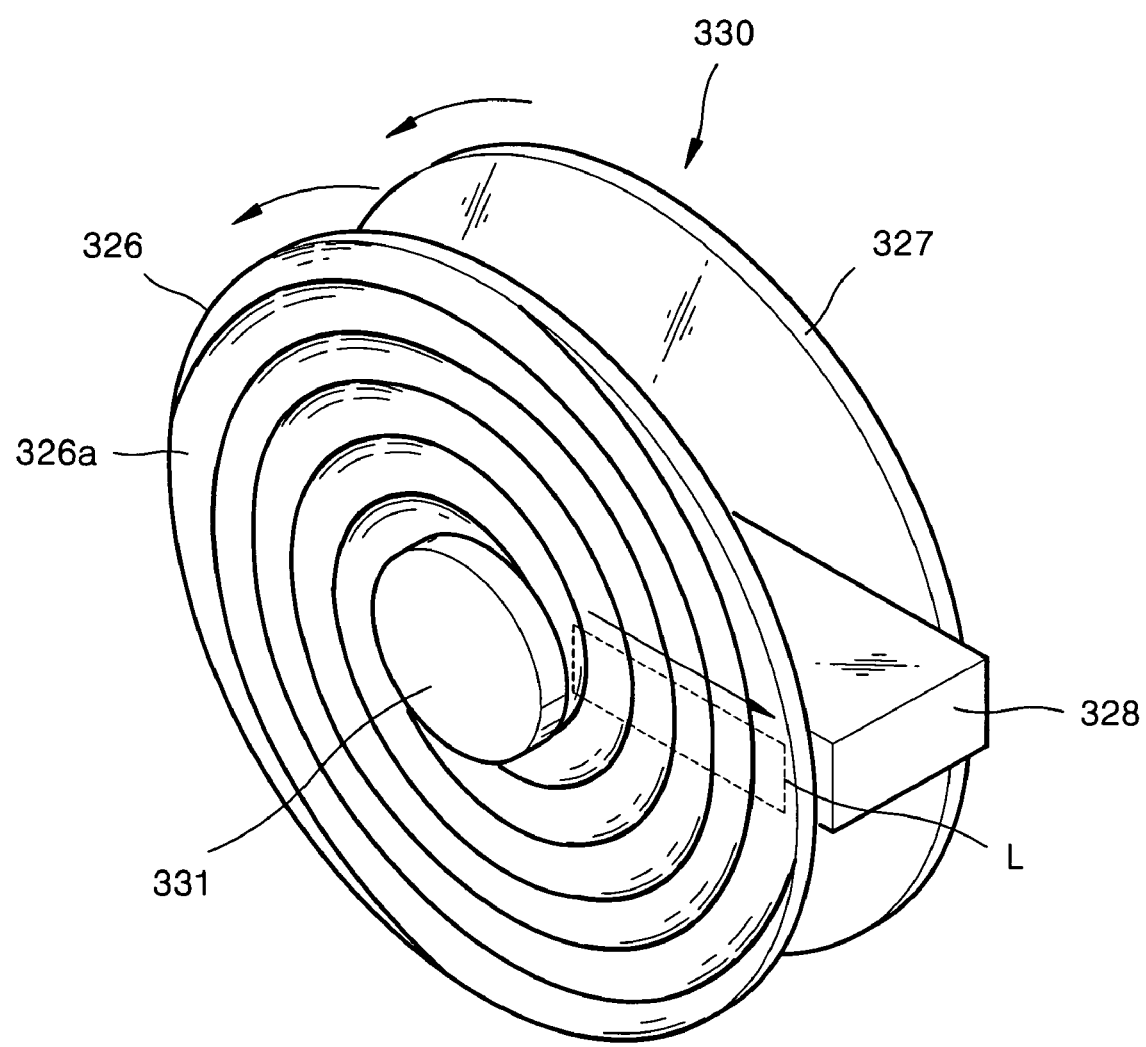
FIG. 21B is a perspective view of the scrolling unit adopted in the projection system of FIG. 16.

Referring to FIGS. 21A and 21B, the scrolling unit 330 includes first and second spiral lens disks 326 and 327 a predetermined distance apart from each other, and a glass rod 328 installed between the first and second spiral lens disks 326 and 327. The first and second spiral lens disks 326 and 327 are formed by spirally arranging cylindrical lens cells 326a and 327a, respectively, on at least one side of each of the first and second spiral lens disks 326 and 327. The cross-section of each of the first and second spiral lens disks 326 and 327 looks like a cylindrical lens array. The first and second spiral lens disks 326 and 327 are rotated at a uniform speed.

Referring back to FIG. 16, first and second cylindrical lenses 325 and 331 are installed in front of the first spiral lens disk 326 and behind the second spiral lens disk 327, respectively. The first and second cylindrical lenses 325 and 331 can be replaced by first and second optical diffraction elements that each have a diffraction pattern designed to focus an incident beam so that the cross-section of the incident beam is only reduced in one direction.

First and second fly-eye lens arrays 333 and 335 and a relay lens 338 can be further installed on a light path between the second spiral lens disk 327 and the light valve 340. The first and second fly-eye lens arrays 333 and 335 include a two-dimensional array of convex portions 333a and a two-dimensional array of convex portions 335a, respectively. Each of the arrays of convex portions 333a and 335a is formed on the incidence surface and/or emission surface of each of the first and second fly-eye lens arrays 333 and 335. The projection lens unit 345 magnifies an image formed by the light valve 340 and projects the magnified image onto the screen 350.

As described above, the projection system according to the second embodiment of the present invention adopts the light pipes 315, 315', and 315". However, they can be applied to any projection system as long as they can form an image due to scrolling.

The operational relationship between each of the light pipes 315, 315', and 315" and the projection system of FIG. 16 will now be described with reference to FIG. 16. Referring to FIG. 16, first, white light emitted from the light source 310 passes through the collimating lens 314 and is then incident upon each of the light pipes 315, 315', and 315".

Each of the light pipes 315, 315', and 315" separates the incident white beam into the R, G, and B color beams $I_1$, $I_2$, and $I_3$ with different cross-section areas and different light amounts. Light made up of the R, G, and B color beams $I_1$, $I_2$, and $I_3$ is narrowed in cross-section while passing through the first cylindrical lens 325. The light with a narrowed cross-section is incident upon the first spiral lens disk 326. Thereafter, the light passes through the glass rod 328 and is then incident upon the second spiral lens disk 327. The glass rod 328 and the second spiral lens disk 327 prevent divergence of the light transmitted by the first spiral lens disk 326.

The glass rod 328 plays two roles. Firstly, the glass rod 328 delivers the light transmitted by the first spiral lens disk 326 to the second spiral lens disk 327 without being diverged. Secondly, the glass rod 328 emits the incident light without changing as a light guide does.

As the first and second spiral lens disks 326 and 327 rotate a constant speed while the R, G, and B beams $I_1$, $I_2$, and $I_3$ are passing through the scrolling unit 330, an effect where the positions of the R, G, and B beams $I_1$, $I_2$, and 13 look to be continuously and periodically changing can be obtained.

Since the principle of forming an image due to scrolling was described above with reference to FIGS. 10, 11, and 12, it will not be described here in detail.

Figure 22:
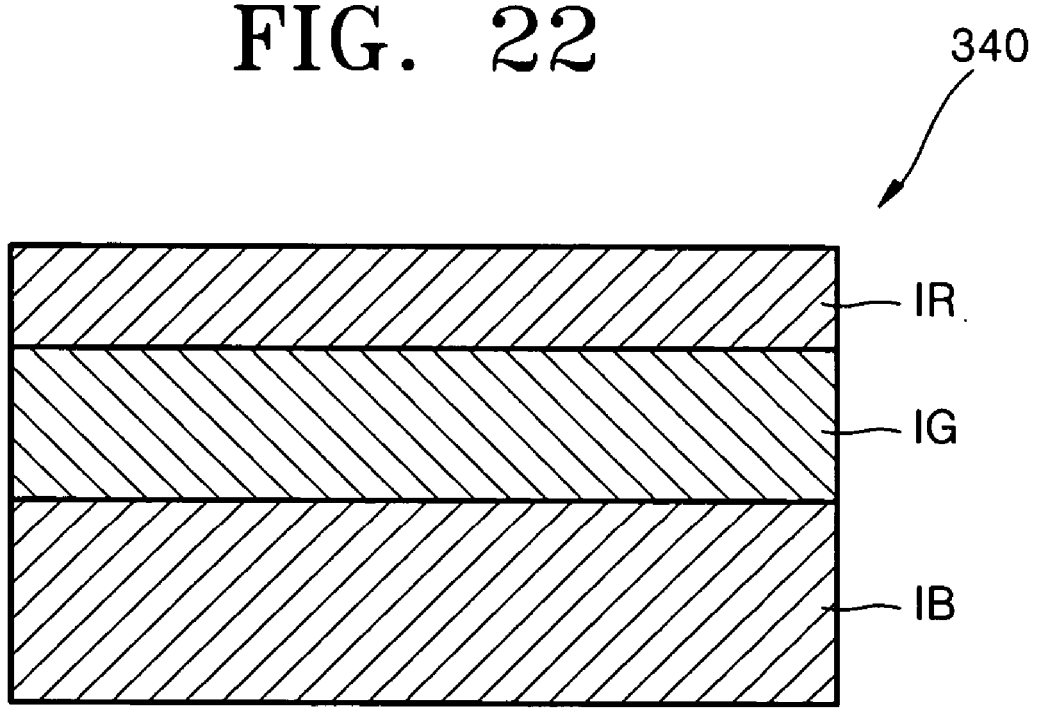
FIG. 22 shows the shapes of color bars formed by a light pipe according to the present invention.

As shown in FIG. 22, color bars with different cross-section areas are formed on the light valve 340 by each of the light pipes 315, 315', and 315". For example, a red bar IR can be formed on the upper part of the light valve 340, a green bar IG can be formed on the middle part of the light valve 340, and a blue bar IB can be formed on the lower part of the light valve 340. When the cross-section areas of the red, green, and blue bars IR, IG, and IB are $S_{IR}$, $S_{IG}$, and $S_{IB}$, respectively, at least two of the cross-section areas $S_{IR}$, $S_{IG}$, and $S_{IB}$ can be different. For example, the cross-section areas $S_{IR}$, $S_{IG}$, and $S_{IB}$ can satisfy the relationship of $S_{IR} \leq S_{IG} < S_{IB}$ or $S_{IR} < S_{IG} \leq S_{IB}$ or its inverse relationship of $S_{IR} \geq S_{IG} > S_{IB}$ or $S_{IR} > S_{IG} \geq S_{IB}$.

The cross-section areas of the color bars vary depending on the areas of the first dichroic mirror planes 318a and 321, second dichroic mirror planes 319a and 322, and third dichroic mirror planes 320a and 323 of the light pipes 315, 315', and 315".

As described above, the areas of the formed color bars are different, so the color gamut and color temperature of an image obtained from the color bars vary. Thus, various colors or moods of the image can be produced.

Figure 23:
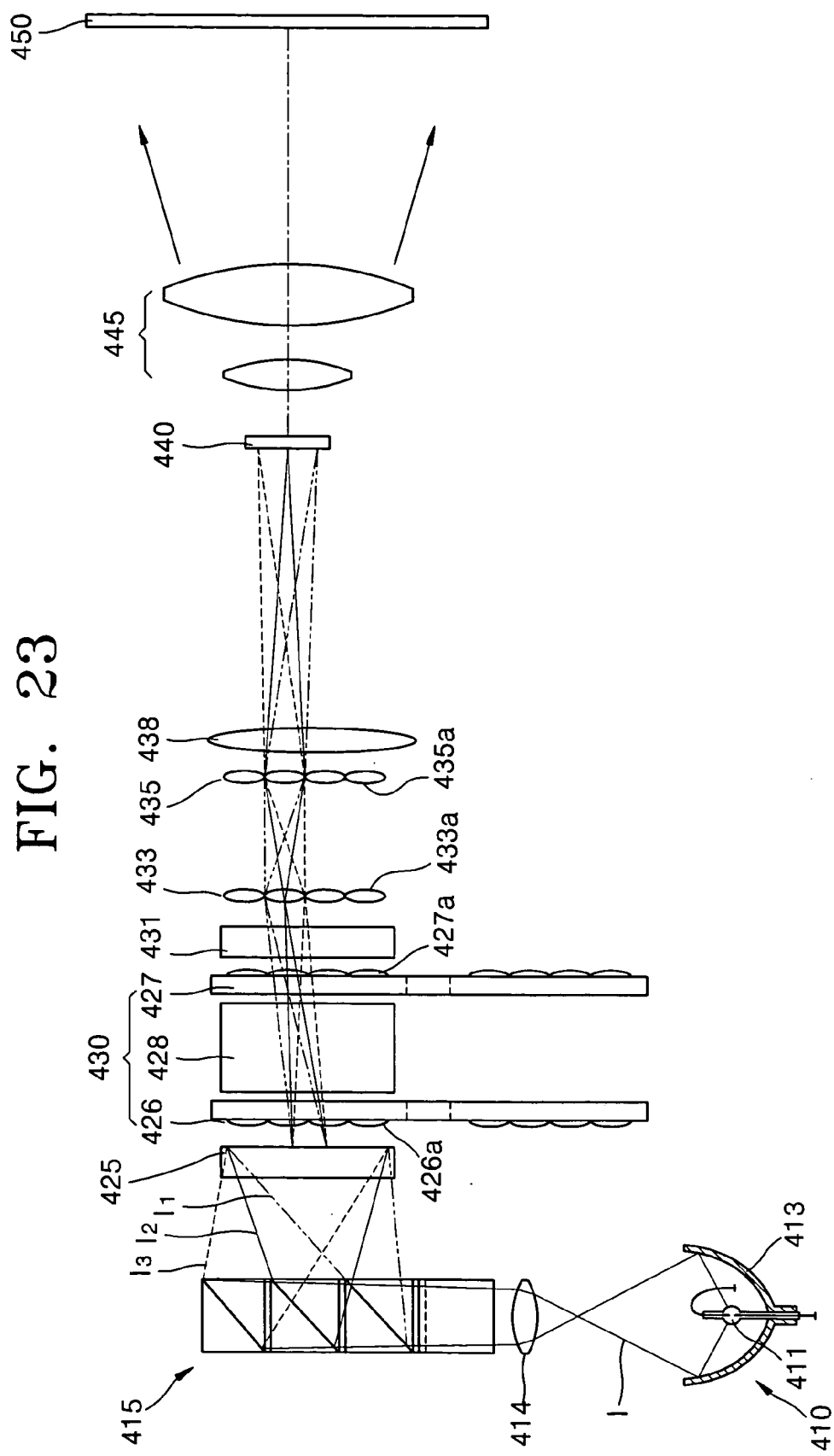
FIG. 23 shows an optical configuration of a projection system according to a third embodiment of the present invention.

FIG. 23 shows an optical configuration of a projection system according to a third embodiment of the present invention. Referring to FIG. 23, the projection system according to a third embodiment of the present invention includes a light source 410, a light pipe 415, a scrolling unit 430, and a light valve 440. The light pipe 415 separates light emitted from the light source 410, according to color. The scrolling unit 430 scrolls R, G, and B beams, into which the light emitted from the light source 410 has been separated by the light pipe 415. The light valve 440 forms an image by processing the scrolling R, G, and B beams according to an image signal.

The light source 410 produces and emits white light and includes a lamp 411 for generating light and a reflection mirror 413 for reflecting light emitted from the lamp 411 and guiding the path of the reflected light. The reflection mirror 413 may be an elliptic mirror whose first focal point is the position of the lamp 411 and a second focal point is a point where light is focused. Alternatively, the reflection mirror 413 may be a parabolic mirror which uses the lamp 411 as a focal point and is designed so that light beams that are emitted from the lamp 61 and reflected by the parabolic mirror are collimated. The reflection mirror 413 shown in FIG. 23 is an elliptic mirror. When a parabolic mirror is used as the reflection mirror 413, a lens for focusing light must be further included.

A collimating lens 414 for collimating incident light is installed on a light path between the light source 410 and the light pipe 415. Preferably, given that P denotes the distance between the light source 410 and the focal point f where light emitted from the light source 410 is focused, the collimating lens 414 is installed P/5 apart from the focal point f. By installing a projection system in this way, the etendue of the projection system, which denotes an optical conservation quantity, can be reduced, so the structure of an optical system can be made more compact and easily formed.

Figure 24:
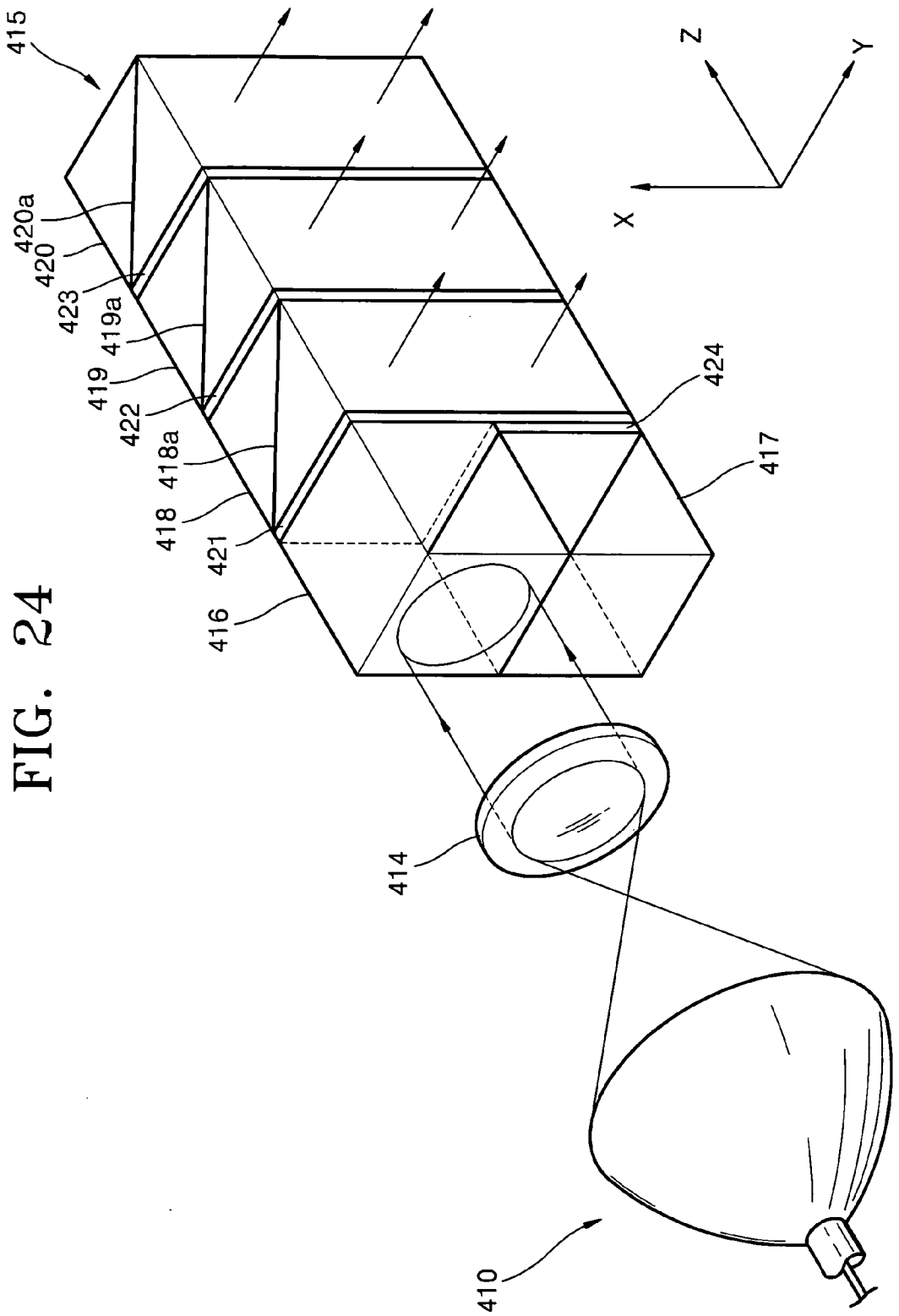
FIG. 24 is a perspective view of a light pipe according to a third embodiment of the present invention.

As shown in FIG. 24, the light pipe 415 includes a first polarized beam splitter 416 for reflecting light with one polarization direction and at the same time transmitting light with the other polarization direction, a second polarized beam splitter 417 installed below the first polarized beam splitter 416, and third, fourth, and fifth polarized beam splitters 418, 419, and 420 installed adjacent to the first and second polarized beam splitters 416 and 417.

A first color selection polarizer 421 for changing the polarization direction of light with a particular wavelength is installed between the first and third polarized beam splitters 416 and 418. A second color selection polarizer 422 is installed between the third and fourth polarized beam splitters 418 and 420. A ½ wavelength plate or a third color selection polarizer 423 for changing the polarization direction of incident light is installed between the fourth and fifth polarized beam splitters 419 and 420. A ½ wavelength plate 424 for changing the polarization direction of incident light is installed between the second polarized beam splitter 417 and the first color selection polarizer 421.

Figure 25A:
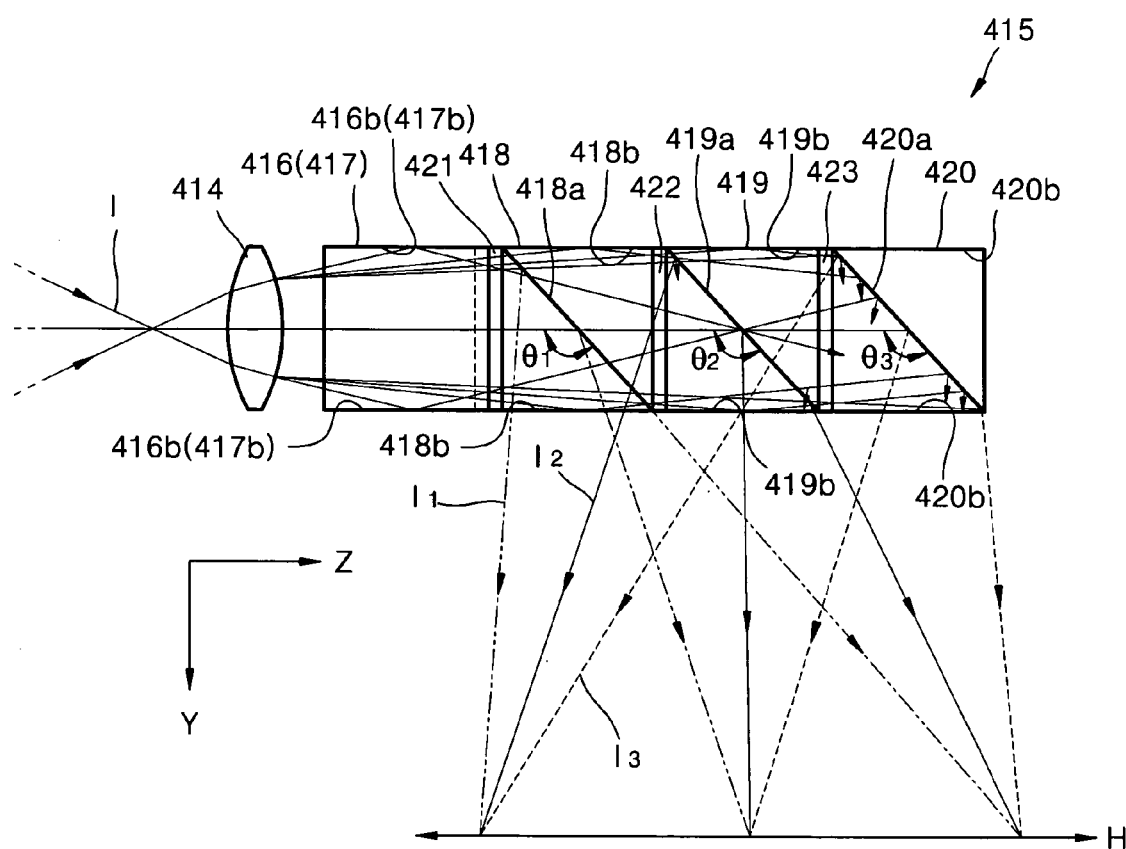
FIG. 25A is a top view of the light pipe of FIG. 24.

Referring to FIG. 25A, the third, fourth, and fifth polarized beam splitters 418, 419, and 420 have first, second, and third mirror planes 418a, 419a, and 420a, respectively, which are inclined at angles $\theta_1$, $\theta_2$, and $\theta_3$, respectively, with respect to the axis of incident light. The angles $\theta_1$, $\theta_2$, and $\theta_3$ satisfy Equation 2:

$$\theta_1 \geq \theta_2 \geq \theta_3 \tag{2}$$

Figure 25B:
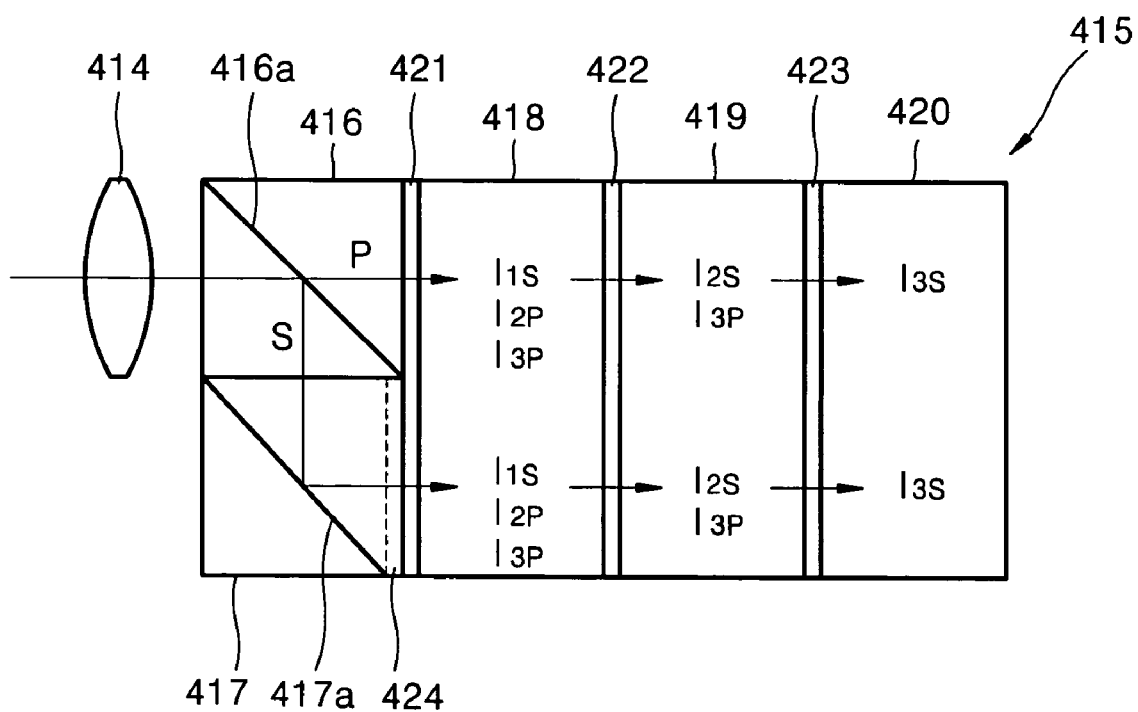
FIG. 25B is a front view of the light pipe of FIG. 24.

As shown in FIG. 25B, the first polarized beam splitter 416 transmits light with one polarization direction, for example, P-polarized light, among incident white light and at the same time reflects S-polarized light. The first color selection polarizer 421 changes the polarization direction of only light in a particular wavelength range among the P-polarized light transmitted by the first polarized beam splitter 416. More specifically, the first color selection polarizer 421 changes the P-polarization direction of only first color light to an S-polarization direction so as to obtain first S-polarized color light $I_{1S}$ while maintaining the P-polarization direction of each of second and third P-polarized color light $I_{2P}$ and $I_{3P}$. The first S-polarized color light $I_{1S}$ is reflected by the third polarized beam splitter toward the outside of the light pipe 415.

The second and third P-polarized color light $I_{2P}$ and $I_{3P}$ passes through the third polarized beam splitter 418 and is then incident upon the second color selection polarizer 422. The second color selection polarizer 422 changes the P-polarization direction of the second color light $I_{2P}$ to an S-polarization direction so as to obtain second S-polarized color light $12_S$ while maintaining the P-polarization direction of the third color light $I_{3P}$. The second S-polarized color light $I_{2S}$ is reflected by the fourth polarized beam splitter 419 toward the outside of the light pipe 415. The third P-polarized color light $I_{3P}$ transmitted by the fourth polarized beam splitter 419 is incident upon the third color selection polarizer 423, and its polarization direction is changed to an S-polarization direction to obtain third S-polarized color light $1_{3S}$. The third S-polarized color light $I_{3S}$ is reflected by the fifth polarized beam splitter 420. In this way, light I emitted from the light source 410 is separated into first, second, and third color beams $I_1$, $I_2$, and $I_3$ by the light pipe 415.

The light pipe 415 is constituted with the first through fifth polarized beam splitters 416 through 420, the first through third color selection polarizers 421 through 423, and the ½ wavelength plate 424. Preferably, the light pipe 415 having such a structure includes total reflection planes 416b, 417b, 418b, 419b, and 420b for total-reflecting light that is incident at a predetermined angle, that is, a critical angle or greater. The total reflection planes 416b, 417b, 418b, 419b, and 420b are provided on external planes of the first, second, third, fourth, and fifth polarized beam splitters 416, 417, 418, 419, and 420, respectively, other than the incidence and emission planes thereof.

The total reflection planes 416b, 417b, 418b, 419b, and 420b reduce a loss in light hat travels within the light pipe 415, thereby increasing light efficiency. Light that is incident upon the total reflection planes 416b, 417b, 418b, 419b, and 420b after being reflected at least one time within the first, second, third, fourth, and fifth polarized beam splitters 416, 417, 418, 419, and 420 is not total-reflected but transmitted by the total reflection planes 416b, 417b, 418b, 419b, and 420b because the incidence angle of the light is smaller than the critical angle.

Referring back to FIG. 23, the scrolling unit 430 includes first and second spiral lens disks 426 and 427 a predetermined distance apart from each other, and a glass rod 428 installed between the first and second spiral lens disks 426 and 427, similar to the structure of the scrolling unit 330 as shown in FIGS. 21A and 21B. The first and second spiral lens disks 426 and 427 are formed by spirally arranging cylindrical lens cells 426a and 427a, respectively, on at least one side of each of the first and second spiral lens disks 426 and 427. The cross-section of each of the first and second spiral lens disks 426 and 427 looks like a cylindrical lens array.

First and second cylindrical lenses 425 and 431 are installed in front of the first spiral lens disk 426 and behind the second spiral lens disk 427, respectively. The first and second cylindrical lenses 425 and 431 can be replaced by first and second optical diffraction elements that each have a diffraction pattern designed to focus an incident beam so that the cross-section of the incident beam is only reduced in one direction.

First and second fly-eye lens arrays 433 and 435 and a relay lens 438 can be further installed on a light path between the second spiral lens disk 427 and the light valve 440. The first and second fly-eye lens arrays 433 and 435 include a two-dimensional array of convex portions 433a and a two-dimensional array of convex portions 435a, respectively. Each of the arrays of convex portions 433a and 435a is formed on the incidence surface and/or emission surface of each of the first and second fly-eye lens arrays 433 and 435. The projection lens unit 445 magnifies an image formed by the light valve 440 and projects the magnified image onto a screen 450.

A color illumination system of the projection system according to the third embodiment of the present invention includes the light source 410, the light pipe 415 for separating light emitted from the light source 410, according to color, and the scrolling unit 430 for scrolling R, G, and B beams, into which the light emitted from the light source 410 has been separated by the light pipe 415, so as to continuously change the paths of the R, G, and B beams. The color illumination system may further include the first and second cylindrical lenses 425 and 431 and the first and second fly-eye lens arrays 433 and 435 so as to achieve highly-efficient scrolling of the light emitted from the light source 410. The first and second cylindrical lenses 425 and 431 are respectively installed in front of and behind the scrolling unit 430, and the first and second fly-eye lens arrays 433 and 435 enable the R, G, and B beams transmitted by the scrolling unit 430 to land on three respective color areas of the light valve 440 to form color bars.

The first and second cylindrical lenses 425 and 431 converge or diverge an incident beam so that the cross-section of the incident beam is only reduced in one direction. To reduce the thickness of each of the first and second cylindrical lenses 425 and 431, an optical diffraction element or a cylindrical lens array can be used as each of the first and second cylindrical lenses 425 and 431.

The operational relationship between the color illumination system having such a structure and the projection system according to the third embodiment of the present invention will now be described with reference to FIGS. 23, 25A, and 25B. First, white light I emitted from the light source 410 passes through the collimating lens 414 and is then incident upon the light pipe 415, which includes the first, second, and third selection polarizers 421, 422, and 423.

Referring to FIGS. 25A and 25B, the first color selection polarizer 421, for example, a Y/B color selection polarizer, changes the polarization direction of light with a B wavelength while maintaining the polarization direction of light with a yellow (Y) wavelength. In other words, the first color selection polarizer 421 changes the polarization direction of only the light with a B wavelength while maintaining the polarization direction of light with the other wavelengths. The second color selection polarizer 422, for example, a C/R color selection polarizer, changes the polarization direction of light with a R wavelength while maintaining the polarization direction of light with a cyan (C) wavelength. In other words, the second color selection polarizer 422 changes the polarization direction of only the light with an R wavelength while maintaining the polarization direction of light with the other wavelengths. The third color selection polarizer 423, for example, a G/M color selection polarizer, changes the polarization direction of light with a G wavelength while maintaining the polarization direction of light with a magenta (M) wavelength. In other words, the third color selection polarizer 423 changes the polarization direction of only the light with a G wavelength while maintaining the polarization direction of light with the other wavelengths.

As described above, the unpolarized white light I is incident upon the light pipe 415 including the first, second, and third color selection polarizers 421, 422, and 423. More specifically, first, the first polarized beam splitter 416 receives the unpolarized white light I and reflects S-polarized light among the incident light I while transmitting P-polarized light. Thereafter, the first (Y/B) color selection polarizer 421 changes light with the B wavelength among the P-polarized light to S-polarized B light while maintaining the P polarization state of the light with the other wavelengths. Then, the third polarized beam splitter 418 reflects the S-polarized B light and at the same time transmits P-polarized R light and P-polarized G light to the second (C/R) color selection polarizer 422.

Next, the second (C/R) color selection polarizer 422 changes the P-polarized R light to S-polarized R light and at the same time maintains the P polarization state of the G light. Then, the fourth polarized beam splitter 419 reflects the S-polarized R light and at the same time transmits the P-polarized G light to the third (G/M) color selection polarizer 423.

The third (G/M) color selection polarizer 423 changes the P-polarized G light to S-polarized G light, which is reflected by the fifth polarized beam splitter 420. The third color selection polarizer 423 can be replaced by a ½ wavelength plate which changes the polarization direction of light.

The S-polarized light reflected by the first polarized beam splitter 416 is reflected by the second polarized beam splitter 417 toward the ½ wavelength plate 424. The ½ wavelength plate 424 changes the S-polarized light to P-polarized light. The first color selection polarizer 421 receives the P-polarized light and changes B light among the P-polarized light to S-polarized B light while maintaining the P-polarization states of R and G light. The S-polarized B light is reflected by the third polarized beam splitter 418 and the P-polarized R light and the P-polarized G light are transmitted thereby toward the second color selection polarizer 422.

Then, the P-polarized R light is changed to S-polarized R light by the second color selection polarizer 422, and the S-polarized R light is reflected by the fourth polarized beam splitter 419. At the same time, the P-polarization state of the G light is maintained by the second color selection polarizer 422 and transmitted by the fourth polarized beam splitter 419.

Thereafter, the P-polarized G light is changed to S-polarized G light by a ½ wavelength plate or the third color selection polarizer 423, and the S-polarized G light is reflected by the fifth polarized beam splitter 420.

In FIG. 25A, reference character H denotes an image plane on which R, G, and B color beams land.

In this way, R, G, and B color beams are reflected by the first, second, and third polarized beam splitters 418, 419, and 420, respectively. The cross-section of light made up of the R, G, and B color beams is reduced by the first cylindrical lens 425, and the R+G+B light with a narrowed cross-section is incident upon the first spiral lens disk 426.

Then, light transmitted by the glass rod 428 is incident upon the second spiral lens disk 427. The glass rod 428 and the second spiral lens disk 427 prevent further divergence of the light transmitted by the first spiral lens disk 426.

Figure 26A:
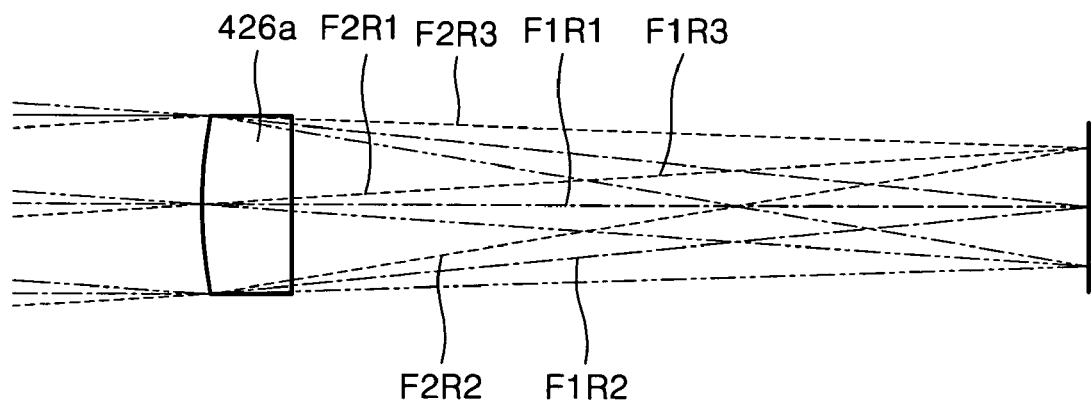
FIGS. 26A and 26B show the divergent angles of a beam by simulation when the projection system according to the third embodiment of the present invention includes no second spiral lens disks and when it includes the second spiral lens disk, respectively.
Figure 26B:
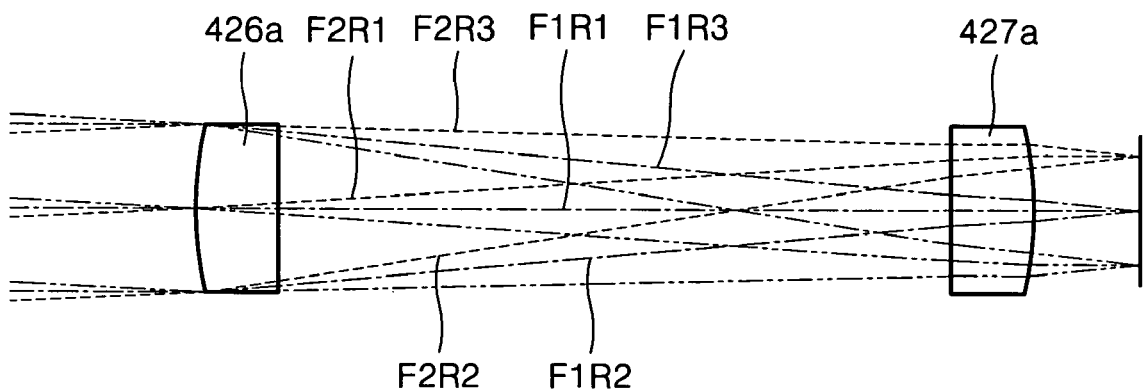

The prevention of further divergence of light by the second spiral lens disk 427 can be seen with reference to FIGS. 26A and 26B. FIGS. 26A and 26B show the results of simulations performed on the divergent angles of light transmitted by the first spiral lens disk 426 in a first case where no second spiral lens disks 427 are installed and in a second case where the second spiral lens disk 427 is installed, respectively. In FIGS. 25A and 25B, only one lens cell 426a and only one lens cell 427a instead of the first and second spiral lens disks 426 and 427 are shown for simplicity.

Given that the numerical aperture (NA) of each of the lens cells 426a and 427a of FIGS. 26A and 26B is 0.104, Table 1 shows the divergent angles of beams with different wavelengths on an image plane.

TABLE 1

|  | Divergent angle of light in first case (°) | Divergent angle of light in second case (°) |
| --- | --- | --- |
| F1R1 | 0 | 0 |
| F1R2 | 6.08241185604 | 6.02953862536 |
| F1R3 | 6.08241185604 | 6.02953862536 |
| F2R1 | 4.0 | 0.5895576931389 |
| F2R2 | 10.0290329291 | 6.54223989609 |
| F2R3 | 2.18773761515 | 5.5440169460 |

In Table 1, F1 denotes a sub-beam that travels at the center among sub-beams in different paths that constitute a beam with a wavelength, and F2 denotes one of the other two sub-beams at both sides of the center sub-beam. Because the two sub-beams at both sides of the center sub-beam are symmetrical, only one of the two sub-beams is shown in FIGS. 26A and 26B. It can be seen from Table 1 that the divergent angles of the sub-beams F1 and F2 in the second case where the second spiral lens disk 427 is installed are less than those in the first case where no second spiral lens disks 427 are installed.

When the glass rod 428 is installed between the first and second spiral lens disks 426 and 427, it enables the light transmitted by the first spiral lens disk 426 to be delivered to the second spiral lens disk 427 without being further diverged. At the same time, the glass rod 428 plays a role of a light guide by emitting incident light without changing.

Figure 27A:
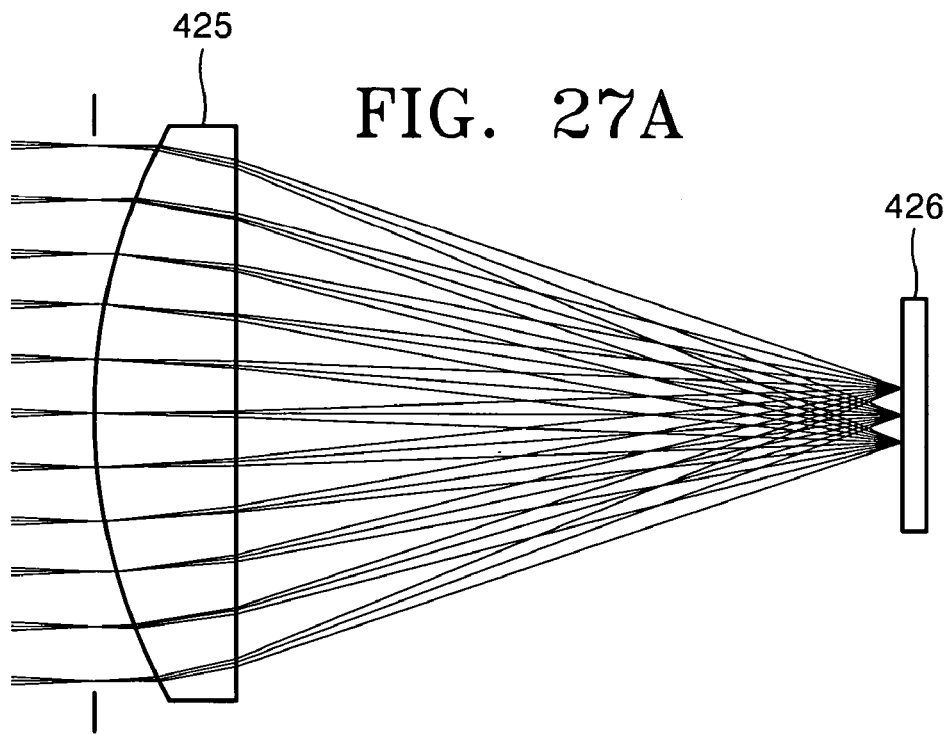
FIGS. 27A through 27C are views for explaining the operational effect of the glass rod adopted in the projection system according to the third embodiment of the present invention.
Figure 27B:
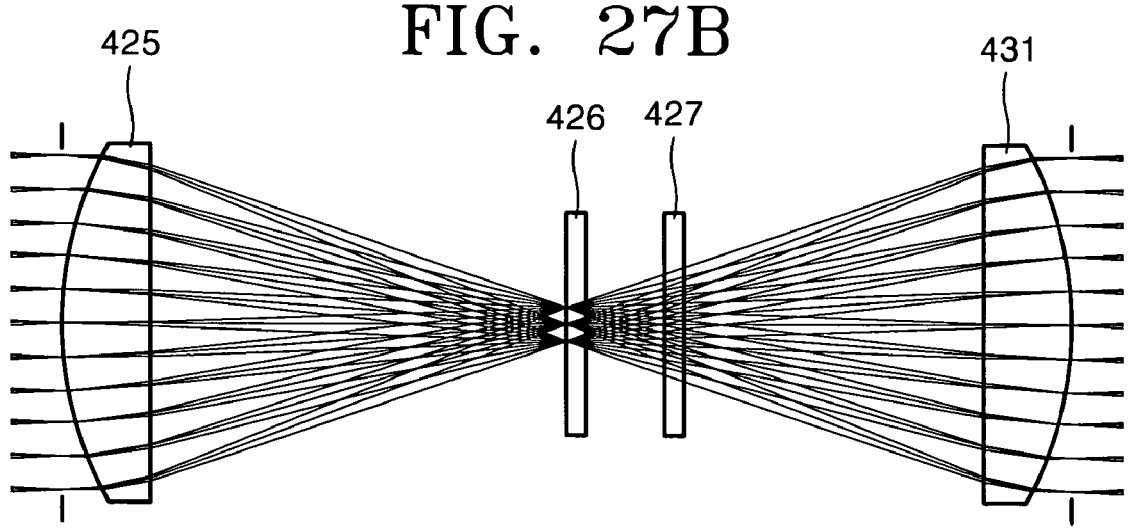
Figure 27C:
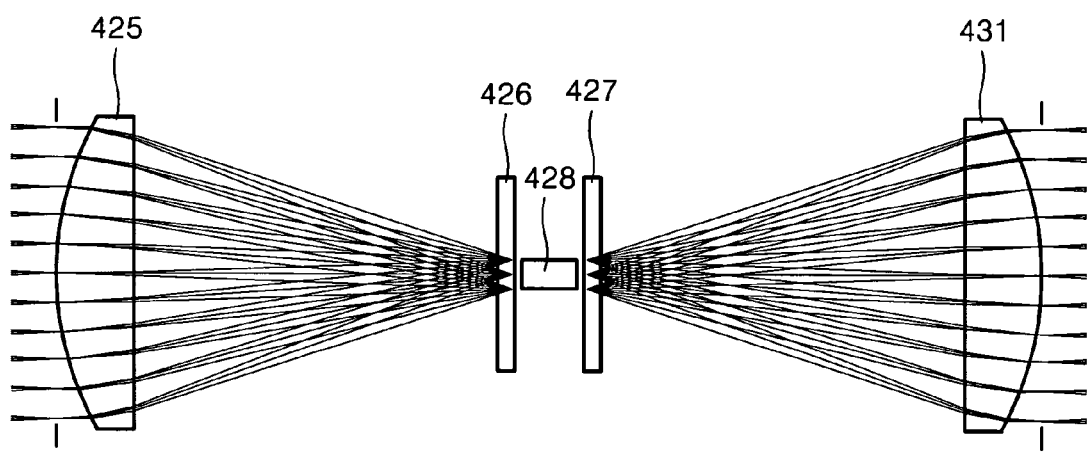

FIG. 27A shows a case where light transmitted by the first cylindrical lens 425, which has a ±2° field, is focused on the first spiral lend disk 426. The light focused on the first spiral lens disk 426 has a 8 mm cross-section. FIG. 27C shows the path of light that passes through the first cylindrical lens 425, the first and second spiral lens disks 426 and 427, and the second cylindrical lens 431 in the case where no glass rods 428 are installed. In this case, the light focused on the first spiral lens disk 426 has a cross-section of about 8 mm, and the light focused on the second spiral lens disk 427 has a cross-section of about 26 mm.

When the cross-section areas of light focused on the first and second spiral lens disks 426 and 427 are different as described above, the light diverges at a large divergent angle and is then focused on the second cylindrical lens 431. To overcome this large divergence, as shown in FIG. 27C, the glass rod 428 is installed between the first and second spiral lens disks 426 and 427 and equalizes the cross-section areas of light focused on the first and second spiral lens disks 426 and 427. The glass rod 428 may be about 20 mm in length. Hence, the glass rod 428 reduces the divergent angle of light, thereby reducing light loss.

Since the scrolling of the scrolling unit 430 having such a structure is the same as the scrolling of the scrolling unit 90 described with reference to FIGS. 11 through 12, it will not be described in greater detail.

When the first and second spiral lens disks 426 and 427 rotate at a constant speed, color scrolling is achieved. The glass rod 428 is fixed between the first and second spiral lens disks 426 and 427.

When R, G, and B color beams pass through the first spiral lens disk 426, it appears from the point of view of beams L that the first spiral lens disk 426 continuously moves up and down at a uniform speed. Hence, an effect where the positions of the beams transmitted by the first spiral lens disk 426 look to be continuously changing can be produced.

First, the R, G, and B color beams pass through the first spiral lens disk 426, the glass rod 428, the second spiral lens disk 427, the second cylindrical lens 431, the first and second fly-eye lens arrays 433 and 435, and the relay lens 438 and form color bars on the light valve 440 in an R, G, and B order. Next, as the first and second spiral lens disks 426 and 427 rotate, the lens surfaces of the first and second spiral lens disk 426 and 427 gradually move up while the R, G, and B color beams pass through the first and second spiral lens disks 426 and 427. As the first and second spiral lens disks 426 and 427 move, color bars are formed in a G, B, and R order. Then, as the first and second spiral lens disks 426 and 427 rotate, color bars are formed in a B, R, and G order.

Such scrolling of the R, G, and B beams repeats as the first and second spiral lens disks 426 and 427. In other words, the locations of lenses upon which the R, G, and B beams are incident change according to the rotations of the first and second spiral lens disks 426 and 427, and the rotations of the first and second spiral lens disks 426 and 427 are converted into a rectilinear motion of a cylinder lens array at the cross-sections of the first and second spiral lens disks 426 and 427 so that scrolling is performed.

Since the first and second spiral lens disks 426 and 427 continuously rotate in one direction without changing the rotation direction in order to perform scrolling, continuity and consistency can be guaranteed. In addition, scrolling using the single spiral lens disk 430 contributes to keep the speed of color bars constant. Further, the first and second spiral lens disks 426 and 427 and the glass rod 428 contribute to reduce the divergent angles of the R, G, and B beams, thereby reducing light loss.

Since R, G, and B beams with cross-sections narrowed by the first cylindrical lens 425 pass through the first and second spiral lens disks 426 and 427, the effect of beams passing through a cylinder lens array that moves rectilinearly can be obtained. The second cylindrical lens 431 receives the R, G, and B beams with narrowed cross-sections from the second spiral lens disk 427 and turns the narrowed cross-sections of the received beams into its original state, such that the received beams are collimated.

Thereafter, R, G, and B beams transmitted by the second cylindrical lens 431 are focused on three respective color areas of the light valve 440 by the first and second fly-eye lens arrays 433 and 435. For example, R beams are overlapped on the upper area of the light valve 440, G beams are overlapped on the middle area of the light valve 440, and B beams are overlapped on the lower area of the light valve 440, thereby forming individual color bars. If no first and second fly-eye lens arrays 433 and 435 are installed, the R, G, and B beams land on individual pixels of the light valve 440, and R, G, and B beams in each pixel are scrolled. The scrolling of R, G, and B beams in each pixel cannot be easily controlled, increases the probability that errors occur, and may degrade the quality of image. However, in the present invention, R, G, and B beams are focused on three respective color areas of the light valve 440 by the first and second fly-eye lens arrays 433 and 435, thereby forming color bars. The color bars are scrolled. Scrolling the color bars is easy.

Also, the first and second fly-eye lens arrays 433 and 435 cause the light valve 440 to emit light with uniform intensity.

The relay lens 438 delivers beams transmitted by the first and second fly-eye lens arrays 433 and 435 to a predetermined location, for example, to the light valve 440.

The number of cylinder lens cells 426a (427a) on the first (second) spiral lens disk 426 (427) can be controlled to synchronize the rotating frequency of the first (second) spiral lens disk 426 (427) with the operating frequency of the light valve 440. That is, if the operating frequency of the light valve 440 is high, more lens cells are included so that the scrolling speed can be controlled to be faster while keeping the rotation speed of the first (second) spiral lens disk 426 (427) constant.

Alternatively, the first (second) spiral lens disk 426 (427) can be synchronized with the light value 440 by maintaining the number of lens cells on the first (second) spiral lens disk 426 (427) uniform and increasing the rotation frequency of the first (second) spiral lens disk 426 (427). For example, when the operating frequency of the light valve 440 is 960 Hz, that is, when the light valve 440 operates at 1/960 of a second per frame such that 960 frames are reproduced per second, the first (second) spiral lens disk 426 (427) can be constructed as follows. The outermost diameter of the first (second) spiral cylinder lens array 426 (427) is 140 mm, the innermost diameter is 60 mm, the number of spiral lens cells 426a (427a) is 32, the width of each spiral lens cell 426a (427a) is 5.0 mm, and the radius of curvature of each spiral lens cell 426a (427a) is 24.9 mm. In this structure, if the first (second) spiral lens disk 426 (427) reproduces 32 frames per one rotation, it must rotate 30 times per second in order to reproduce 960 frames per second. At this speed, the first (second) spiral lens disk 426 (427) must rotate 1800 times for 60 seconds, and accordingly it has a rotation speed of 1800 rpm. When the operating frequency of the light value 440 is increased by half and thus the light valve operates at 1440 Hz, the first (second) spiral lens disk 426 (427) must rotate at a 2700 rpm speed in order to be synchronized with the increased operating frequency of the light valve 440.

A single-plate projection system according to the present invention can maximize light efficiency by using the scrolling unit 430.

A modification of each of the light pipe, the color illumination system, and the projection system according to the third embodiment of the present invention shown in FIG. 23 will now be described with reference to FIGS. 28 and 29.

Figure 28:
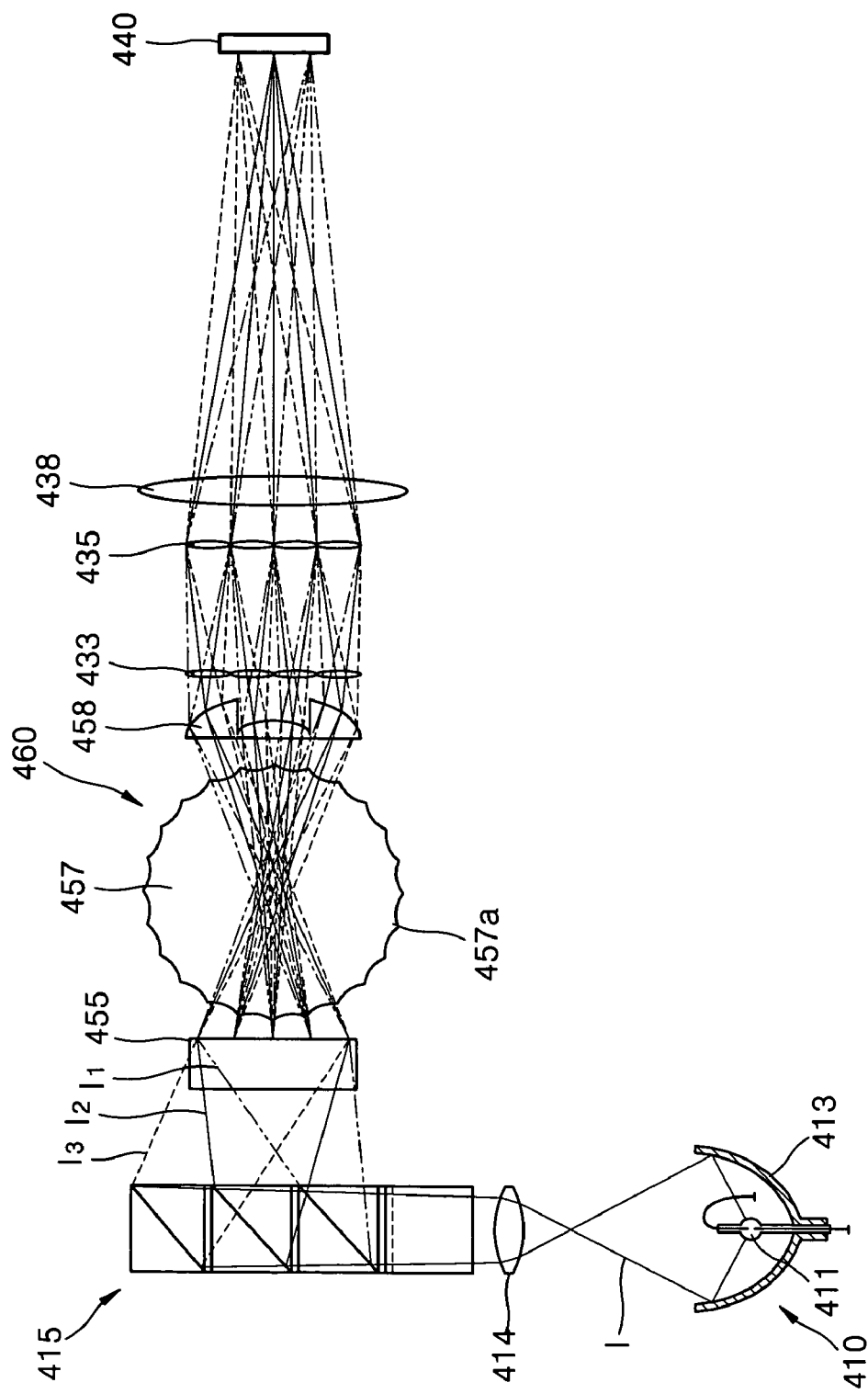
FIG. 28 is a schematic view of the entire configuration of a modification of the projection system of FIG. 23.

Referring to FIG. 28, a modification of the projection system of FIG. 23 includes the light source 410, the light pipe 415 for separating light emitted from the light source 410 according to color, a scrolling unit 460 for scrolling color beams, into which the light has been separated by the light pipe 415, and the light valve 440 for forming an image by processing the scrolling color beams according to an image signal.

The projection system of FIG. 28 is the same as that of FIG. 23 except that the scrolling unit 460 is adopted. Since the elements of FIG. 28 designated by the same reference numerals as those of FIG. 23 perform the same functions, they will not be described here.

As shown in FIG. 28, the scrolling unit 460 includes a cylindrical lens array 457 rotatably installed on a light path and a driving source 459 for rotating the cylindrical lens array 457.

The cylindrical lens array 457 is a cylinder on which a plurality of cylindrical lenses 457a are arranged. The cylindrical lenses 457a independently converge or diverge incident light. Instead of being formed of geometrically concave cylindrical lenses 457a, the cylindrical lens array 457 can be a plate on which a diffraction pattern that can converge or diverge incident light is formed.

The cylindrical lens array 457 is rotated by the driving source 459, which is a typical rotation-driving device, such as, a motor or the like. Since the structure of the rotation-driving device is well known, it will not be described here in detail. The cylindrical lens array 457 is disposed so that the cylindrical lenses 457a can face first and second focusing lenses 455 and 458. As the cylindrical lens array 457 rotates, the cylindrical lenses 457a are scrolled while gradually moving up or down. An effective surface of the cylindrical lens array 457 that contributes to the scrolling of the cylindrical lenses 457a performed with the rotation of the cylindrical lens array 457 is the surface that face each of the first and second focusing lenses 455 and 458. As described above, the cylindrical lens array 457 provides an effect where two plate-type cylindrical lens arrays look to operate.

A modification of the color illumination system according to the third embodiment of the present invention achieves color scrolling by using the light source 410, the light pipe 145, and the scrolling unit 460. Preferably, the modified color illumination system further includes the first and second focusing lenses 455 and 458, the first and second fly-eye lens arrays 433 and 435, and the relay lens 438, The first and second focusing lenses 455 and 458 are disposed such as to face some of the cylindrical lenses 457a of the cylindrical lens array 457. Each of the first and second focusing lenses 455 and 458 may be a half-cylindrical lens.

Since the second focusing lens 458 has substantially the same structure as the focusing lens of FIG. 14, it will not be described here in greater detail.

Figure 29:
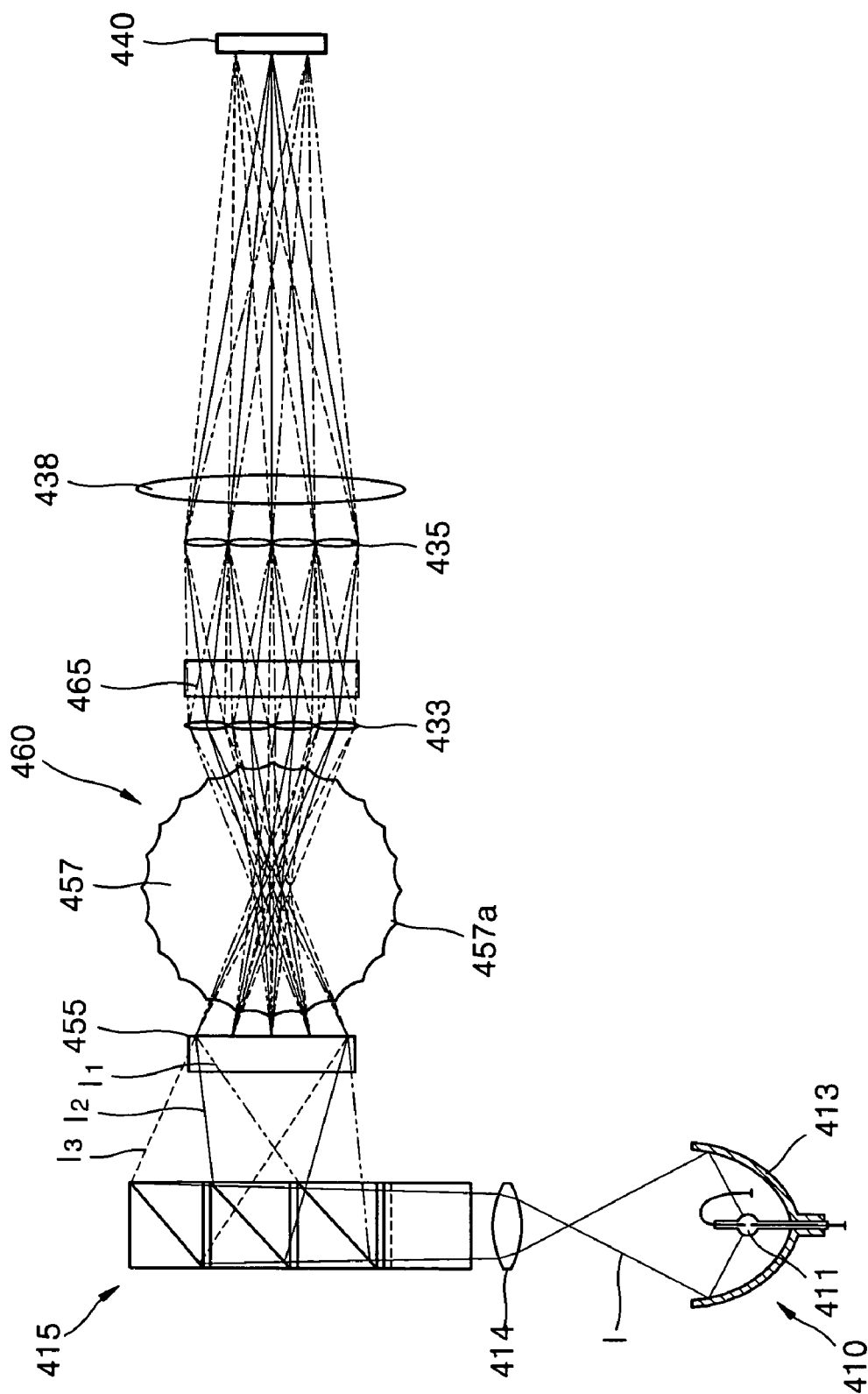
FIG. 29 shows an optical configuration obtained by changing the optical configuration of the modified projection system of FIG. 28.

As shown in FIG. 29, a second focusing lens 465 instead of the second focusing lens 458 is installed between the first and second fly-eye lens arrays 433 and 435. The second focusing lens 465 may be a cylindrical lens array.

In the modified projection system according to the third embodiment of the present invention, color beams, into which light has been separated by the light pipe 415, land on the light valve 440 so that beams of the same color are overlapped thereon by using the first and second fly-eye lens arrays 433 and 435, thereby forming color bars. The color bars are scrolled by using the scrolling unit 460, thereby forming an image.

The light pipes according to the aforementioned embodiments of the present invention can separate incident light into color beams according to a wavelength range and also make full use of the incident light by reflecting beams that are incident at angles greater than a critical angle so that the beams can travel within the light pipes. Thus, the light use efficiency can be increased. Also, color separation units have different sizes according to color so as to differentiate the amounts of light of different colors, so various color gamuts and different color temperatures can be obtained. In other words, each of the light pipes have different-sized dichroic mirror planes so as to control the color temperature and to produce various moods of a color image.

Further, the light pipes can increase light efficiency by separating incident light according to color so as to achieve color scrolling and using both P-polarized light and S-polarized light as effective light.

Each of the color illumination systems according to the aforementioned embodiments of the present invention includes a single scrolling unit through which color beams pass. Thus, the optical configuration of a projection system can be simplified, and light loss can be reduced. In addition, each of the color illumination systems uses a single scrolling unit to perform scrolling, so the optical configuration of a projection system is simplified. Also, since the color illumination systems form color bars, different color images can be produced by controlling the color bars, and accordingly, the quality of a color image can be improved.

Since the projection systems according to the aforementioned embodiments of the present invention are single-panel projection systems, its optical configuration can be simplified, and the number of components for achieving scrolling is reduced. Thus, a light, low-price projection system can be obtained. Since the single-panel projection systems according to the present invention scroll color bars by using a scrolling unit, they can obtain the same light efficiency as the light efficiency of a three-panel projection system. More specifically, each of the single-panel projection systems according to the present invention separates white light into R, G, and B beams at one time and scrolls the three color beams to form a color image. Therefore, the single-panel projection systems according to the present invention can obtain the same light efficiency as the light efficiency of a three-panel projection system.

What is claimed is:

1. A light pipe comprising:
   a first dichroic prism having a first mirror plane, the first mirror plane inclined with respect to the axis of incident light and reflecting a first color beam among white light while transmitting other color beams, the white light being radiated from a light source external to the light pipe;
   a second dichroic prism having a second mirror plane, the second mirror plane inclined with respect to the axis of incident light and reflecting a second color beam among the color beams transmitted by the first dichroic prism while transmitting the other color beam; and
   a third dichroic prism having a third mirror plane, the third mirror plane inclined with respect to the axis of incident light and reflecting a third color beam transmitted by the second dichroic prism,
   wherein each of the first and second dichroic prisms includes additional reflective planes, other than the first and second mirror planes, the additional reflective planes reflect light radiated from the light source that is incident at a predetermined angle due to a difference between the refractive indices of each of the additional reflective planes and the outside so that the incident light travels within the first, second, and third color dichroic prisms, and the additional reflective planes form exteriors of the first, second, and third dichroic prisms and contribute to reducing loss in the first, second, and third color beams.

2. The light pipe of claim 1, further comprising:
   a first polarized beam splitter which is installed on a light incidence plane of the first dichroic prism and transmits first light with one polarization direction among the white light, which is unpolarized, toward the first dichroic prism while reflecting second light with the other polarization direction;
   a second polarized beam splitter re-reflecting the second light received from the first polarized beam splitter toward the first dichroic prism; and
   a ½ wavelength plate which is installed either between the first polarized beam splitter and the first dichroic prism or between the second polarized beam splitter and the first dichroic prism and converts the polarization direction of the second light to that of the first light, so that the unpolarized white light is converted into color beams with an identical polarization direction.

3. The light pipe of claim 2, further comprising a condensing lens that is installed opposite to a light incidence plane of the first polarized beam splitter and condenses and transmits the unpolarized white light.

4. The light pipe of claim 1, wherein the first, second, and third mirror planes are inclined at different angles with respect to the axis of the incident white light and reflect the first, second, and third color beams so that their axes are converged.

5. A color illumination system comprising:
   a light source producing and radiating light;
   a light pipe, which includes first, second, and third dichroic prisms having first, second, and third mirror planes, respectively, and separates incident light according to a wavelength range and advances separated beams at different angles, wherein the first mirror plane is inclined with respect to the axis of incident light and reflects a first color beam among white light while transmitting other color beams, the second mirror plane is inclined with respect to the axis of incident light and reflects a second color beam among the color beams transmitted by the first dichroic prism while transmitting another color beam, the third mirror plane is inclined with respect to the axis of incident light and reflects a third color beam transmitted by the second dichroic prism, and an exterior of each of the first and second dichroic prisms is formed by additional reflective planes, other than the first and second mirror planes, the additional reflective planes reflect light radiated from the light source that is incident at a predetermined angle due to a difference between the refractive indices of each of the additional reflective planes and the outside so that the incident light travels within the first, second, and third dichroic prisms;
   a first focusing lens focusing the separated beams; and
   a scrolling unit which changes the paths of the separated beams focused by the first focusing lens and periodically scrolls the separate beams.

6. A projection system comprising:
   a light source producing and radiating light;

a light pipe, which includes first, second, and third dichroic prisms having first, second, and third mirror planes, respectively, and separates incident light according to a wavelength range and advances separated beams at different angles, wherein the first mirror plane is inclined with respect to the axis of incident light and reflects a first color beam among white light while transmitting other color beams, the second mirror plane is inclined with respect to the axis of incident light and reflects a second color beam among the color beams transmitted by the first dichroic prism while transmitting another color beam, the third mirror plane is inclined with respect to the axis of incident light and reflects a third color beam transmitted by the second dichroic prism, and the exterior of each of the first and second dichroic prisms is formed by additional reflective planes, other than the first and second mirror planes, the additional reflective planes reflect light radiated from the light source that is incident at a predetermined angle due to a difference between the refractive indices of each of the additional reflective planes and the outside so that the incident light travels within the first, second, and third dichroic prisms;

a first focusing lens focusing the separated beams;

a scrolling unit which changes the paths of the separated beams focused by the first focusing lens and periodically scrolls the separate beams;

a second focusing lens re-focusing beams transmitted by the scrolling unit;

a fly-eye lens array delivering the beams transmitted by the scrolling unit;

a light valve producing an image from beams transmitted by the fly-eye lens array; and a projection lens unit magnifying the image produced by the light valve and projecting the magnified image onto a screen.

7. The projection system of claim 6, wherein the first, second, and third mirror planes are inclined at different angles with respect to the axis of the incident white light and reflect the first, second, and third color beams so that their axes are converged.

8. The projection system of claim 6, further comprising:
a first polarized beam splitter which is installed on a light incidence plane of the first dichroic prism and transmits first light with one polarization direction among unpolarized white light toward the first dichroic prism while reflecting second light with the other polarization direction;

a second polarized beam splitter re-reflecting the second light received from the first polarized beam splitter toward the first dichroic prism; and a ½ wavelength plate which is installed either between the first polarized beam splitter and the first dichroic prism or between the second polarized beam splitter and the first dichroic prism and converts the polarization direction of the second light to that of the first light, so that the unpolarized white light is converted into color beams with an identical polarization direction.

9. The projection system of claim 8, further comprising a condensing lens that is installed on a light path between the light source and the first polarized beam splitter and condenses and transmits the unpolarized white light.

10. The projection system of claim 6, wherein each of the first and second focusing lenses is a cylindrical lens which focuses an incident beam so that the cross-section of the incident beam is only reduced in one direction.

11. The projection system of claim 6, wherein each of the first and second focusing lenses is an optical diffraction element which has a diffraction pattern that focuses an incident beam so that the cross-section of the incident beam is only reduced in one direction.

12. The projection system of claim 6, wherein the scrolling unit comprises:
a first cylindrical lens array which includes a plurality of cylindrical lenses that have identical refractive power, are arranged adjacent to one another, and independently converge or diverge incident beams; and a first driving source which drives the first cylindrical lens array to reciprocate in a direction perpendicular to the axis of the incident beams so that the beams passing through the first cylindrical lens array can be scrolled.

13. The projection system of claim 6, wherein the scrolling unit comprises:
a second cylindrical lens array which is apart from the first cylindrical lens array and includes a plurality of cylindrical lenses that have identical refractive power, are arranged adjacent to one another, and independently converge or diverge incident beams; and a second driving source which drives the second cylindrical lens array to reciprocate in a direction perpendicular to the axis of the incident beams.

14. The projection system of claim 6, wherein the scrolling unit comprises:
a revolving cylindrical lens array which is rotatably installed on a light path and formed by arranging a plurality of cylindrical lenses with identical refractive power adjacent to one another on an outer circumference of a cylinder; and a driving source which rotates the revolving cylindrical lens array.

15. The projection system of claim 14, wherein the revolving cylindrical lens array is an optical diffraction element that has a diffraction pattern that can perform the function of the cylindrical lenses.

16. The projection system of claim 6, further comprising a relay lens which delivers beams transmitted by the fly-eye lens array to a predetermined location.

* * * * *